United States Patent
Sun et al.

(10) Patent No.: US 11,042,412 B2
(45) Date of Patent: Jun. 22, 2021

(54) MEMORY ALLOCATION METHOD AND SERVER

(71) Applicant: HUAWEI TECHNOLOGIES CO., LTD., Shenzhen (CN)

(72) Inventors: Beilei Sun, Hangzhou (CN); Shengyu Shen, Hangzhou (CN); Jianrong Xu, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 16 days.

(21) Appl. No.: 16/595,920

(22) Filed: Oct. 8, 2019

(65) Prior Publication Data
US 2020/0042358 A1 Feb. 6, 2020

Related U.S. Application Data
(63) Continuation of application No. PCT/CN2018/088924, filed on May 30, 2018.

(30) Foreign Application Priority Data
Aug. 7, 2017 (CN) .......................... 201710669106.4

(51) Int. Cl.
G06F 12/02 (2006.01)
G06F 9/50 (2006.01)
(Continued)

(52) U.S. Cl.
CPC ........ G06F 9/5016 (2013.01); G06F 12/0646 (2013.01); G06F 13/1668 (2013.01);
(Continued)

(58) Field of Classification Search
None
See application file for complete search history.

(56) References Cited

U.S. PATENT DOCUMENTS 6,115,804 A * 9/2000 Carpenter ........... G06F 12/0813
712/28
8,185,710 B2 * 5/2012 Pong ................... G06F 13/1605
711/163
(Continued)

FOREIGN PATENT DOCUMENTS

CN 102413509 A 4/2012
CN 103428088 A 12/2013
(Continued)

OTHER PUBLICATIONS

Ahmed Jerraya et al., "Multiprocessor Systemson-Chips", Elsevier, 2004, total 5 pages.
(Continued)

*Primary Examiner* — Brian R Peugh
(74) *Attorney, Agent, or Firm* — Stein IP, LLC

(57) ABSTRACT

A memory allocation method and a server, wherein the method includes: identifying, by a server, a node topology table; generating fetch hop tables of the NUMA nodes based on the node topology table; calculating fetch priorities of the NUMA nodes based on the fetch hop tables of the NUMA nodes, and using an NC hop count as an important parameter for fetch priority calculation; and when a NUMA node applies for memory, allocating memory based on the fetch priority table, and for a higher priority, more preferentially allocating memory from a NUMA node corresponding to the priority.

20 Claims, 12 Drawing Sheets

(51) Int. Cl.
*G06F 12/06* (2006.01)
*G06F 13/16* (2006.01)
*G06F 13/40* (2006.01)
*G06F 13/42* (2006.01)

(52) U.S. Cl.
CPC ...... *G06F 13/4027* (2013.01); *G06F 13/4282* (2013.01); *G06F 12/023* (2013.01); *G06F 2209/5013* (2013.01)

(56) References Cited

U.S. PATENT DOCUMENTS

| | | |
|---|---|---|
| 10,303,396 B1 * | 5/2019 | Harvey ................. G06F 3/0689 |
| 2005/0238035 A1 | 10/2005 | Riley |
| 2007/0083728 A1 | 4/2007 | Nijhawan et al. |
| 2009/0006804 A1 | 1/2009 | Lubbers et al. |
| 2010/0211756 A1 | 8/2010 | Kaminski et al. |
| 2014/0237197 A1 | 8/2014 | Gray |
| 2014/0258669 A1 | 9/2014 | Wang et al. |
| 2016/0041906 A1 * | 2/2016 | Mukherjee .......... G06F 16/2379 711/119 |
| 2017/0017419 A1 | 1/2017 | Matthews et al. |
| 2017/0031718 A1 | 2/2017 | Wagle et al. |

FOREIGN PATENT DOCUMENTS

| | | |
|---|---|---|
| CN | 104166596 A | 11/2014 |
| CN | 104166597 A | 11/2014 |
| CN | 105389211 A | 3/2016 |
| CN | 105677373 A | 6/2016 |
| CN | 105988876 A | 10/2016 |

OTHER PUBLICATIONS

Intel,"An Introduction to the Intel quickpath interconnect". White Paper, 2009,total 22 pages.
Intel Xeon Processor E7-8800/4800/2800 Product Families, Datasheet vol. 2 of 2. Apr. 2011,total 50 pages.
Manchanda N, Anand K. "Non-uniform memory access (numa)". New York University, 2010,total 4 pages.
Lameter C. "Numa (non-uniform memory access): An overview". Queue, 2013, 11(7): 40.,,total 12 pages.
Dashti M, Fedorova A, Funston J, et al. "Traffic management: a holistic approach to memory placement on NUMA systems" //ACM SIGPLAN Notices. ACM, 2013, 48(4):total 13 pages.
Hp: "Red Hat Enterprise Linux Non-UniformMemory Access support for HP Proliantservers" ,Jan. 31, 2015 (Jan. 31, 2015), XP055674311,total 46 pages.

* cited by examiner

MEMORY ALLOCATION METHOD AND SERVER

CROSS-REFERENCE TO RELATED APPLICATIONS

This application is a continuation of International Application No. PCT/CN2018/088924, filed on May 30, 2018, which claims priority to Chinese Patent Application No. 201710669106.4, filed on Aug. 7, 2017. The disclosures of the aforementioned applications are hereby incorporated by reference in their entireties.

TECHNICAL FIELD

This application relates to the communications field, and in particular, to a memory allocation method and a server.

BACKGROUND

A calculation capability of a single central processing unit (CPU) tends to be saturated due to a limitation of a hardware chip technology. Therefore, to obtain higher calculation performance, calculation performance of the server tends to be improved by increasing a quantity of processors in the server. For a high-performance server, a non-uniform memory architecture (NUMA) is usually used. To be specific, a plurality of nodes are connected by using a high-speed interconnection network, and each node includes one group of a CPU and local memory. When a node accesses local memory, a fetch latency is relatively low and performance is relatively high. However, if the node accesses remote memory, a fetch latency is relatively high, causing performance degradation. Therefore, to improve system performance, during memory allocation a current memory allocator needs to preferentially allocate the local memory, and then allocate the remote memory.

To reduce a bandwidth limitation during fetch, Intel replaces a conventional front side bus (FSB) with quick path interconnect (QPI), and the QPI is a packet transmission-based serial high-speed point-to-point connection protocol. However, because each node provides only three QPI interfaces, a quantity of nodes that can be interconnected in one server is limited. To resolve the foregoing problem, a node controller (NC) is introduced. The NC provides more node interfaces (NI). Therefore, the quantity of interconnected nodes in the server can be increased by using the NC, to reduce a cross-node fetch latency.

A memory allocation method provided for a conventional NUMA in a current kernel is as follows:

1. A NUMA distance is generated in a system initialization process.

For local nodes, a NUMA distance is 0.

If a node A is interconnected to a node B, that is, A and B are adjacent, a NUMA distance is 20.

If the node A is not interconnected to a node C, a NUMA distance between the node A and the node C is equal to a minimum quantity of hops (Hop) between the node A and the node C multiplied by 20.

2. Memory is allocated based on a node topology, including the following three allocation policies:

A. Local (Local) policy: The policy is intended to increase access traffic of local memory, to reduce a fetch latency. A specific process is as follows:

(1) It is checked whether a local node has sufficient memory.

(2) If the local node has sufficient memory, memory is preferentially allocated from the local node.

(3) If the local node does not have sufficient memory, a node having sufficient memory needs to be sequentially searched for in ascending order of NUMA distances from nodes to the node, and corresponding memory is allocated.

B. Preferred (Preferred) policy: According to the policy, a series of memory nodes are specified, and memory is first allocated from a specified memory node during memory allocation. If allocation of the memory of the specified memory node is completed, memory of another node is allocated.

C. Interleaved (Interleaved) policy: The policy is intended to increase fetch parallelism. According to this policy, a system sequentially allocates memory from memory nodes based on node numbers in a polling manner.

However, in the memory allocation method, it is assumed that a distance or an overhead of each NUMA hop is the same. Therefore, only the NUMA hop is used as a unique input variable in a NUMA distance calculation algorithm. Actually, compared with a direct connection using the QPI, an interconnection using the NC causes an additional fetch latency, in other words, a latency between two nodes that are interconnected by using the NC is far greater than a latency between two nodes that are directly interconnected by using the QPI. As a result, transmission overheads between different NUMA nodes are different. Consequently, in the foregoing memory allocation method, a problem of an NC fails to be considered in the NUMA distance calculation method, and this causes an increase in cross-NC fetch, thereby causing an increase in a fetch latency and degradation in performance of the server.

SUMMARY

Embodiments of this application provide a memory allocation method and a server, to reduce a performance loss caused by an NC latency and improve performance of the server during memory allocation.

A first aspect of the embodiments of this application provides a memory allocation method, including: identifying, by a server, a node topology table, where the node topology table includes a connection relationship between non-uniform memory architecture NUMA nodes, a connection relationship between a NUMA node and a node controller NC, and a connection relationship between NCs in the server; generating, by the server, fetch hop tables of the NUMA nodes based on the node topology table obtained through identification, and setting any one of the NUMA nodes as a first NUMA node, where a fetch hop table of the first NUMA node includes an NC hop count and a quick path interconnect QPI hop count of a shortest path through which the first NUMA node is connected to each of the other NUMA nodes, the NC hop count is a quantity of NCs through which the shortest path passes, and the QPI hop count is a quantity of NUMA nodes through which the shortest path passes; calculating, by the server, fetch priority tables of the NUMA nodes based on the fetch hop tables of the NUMA nodes, where a first fetch priority table of the first NUMA node includes a priority of accessing each of the other NUMA nodes by the first NUMA node, a smaller NC hop count indicates a higher priority of accessing the NUMA node, and for a same NC hop count, a smaller QPI hop count indicates a higher priority of accessing the NUMA node; and when the first NUMA node applies for memory, allocating, by the server, memory based on the first fetch priority table, and for a higher priority, more preferentially allocating memory from a NUMA node corresponding to the priority.

In a possible design, in a first implementation of the first aspect of the embodiments of this application, the method further includes: if there are a plurality of NUMA nodes with a same priority in the first fetch priority table, allocating, by the server, memory from these NUMA nodes with the same priority according to an interleaved policy.

In a possible design, in a second implementation of the first aspect of the embodiments of this application, the generating, by the server, fetch hop tables of the NUMA nodes based on the node topology table specifically includes: reading, by the server, the stored node topology table; calculating a shortest path from each NUMA node to each of the other NUMA nodes based on the node topology table, where the shortest path is a path with a smallest NC hop count in a preselected shortest path, and the preselected shortest path is a path with a smallest QPI hop count in a path from one NUMA node to another NUMA node; calculating, by the server, an NC hop count and a QPI hop count of each shortest path based on the shortest path from each NUMA node to each of the other NUMA nodes; and forming, by the server, the fetch hop tables of the NUMA nodes by using the NC hop count and the QPI hop count of the shortest path from each NUMA node to each of the other NUMA nodes.

In a possible design, in a third implementation of the first aspect of the embodiments of this application, the calculating, by the server, fetch priority tables of the NUMA nodes based on the fetch hop tables of the NUMA nodes specifically includes: sorting, by the server, the NUMA nodes in the fetch hop tables in ascending order of NC hop counts in the fetch hop tables of the NUMA nodes, to obtain a first NUMA node sequence; for NUMA nodes with a same NC hop count in the first NUMA node sequence, sorting, by the server, the NUMA nodes in ascending order of QPI hop counts in the fetch hop tables, to obtain a second NUMA node sequence; and sequentially assigning, by the server, priorities to the NUMA nodes in the second NUMA node sequence in descending order of priorities, where priorities of NUMA nodes with a same NC hop count and a same QPI hop count are the same.

In a possible design, in a fourth implementation of the first aspect of the embodiments of this application, the allocating, by the server, memory based on the first fetch priority table specifically includes: if a current to-be-allocated memory size is a first capacity, a current query priority is a first priority, and the first priority is a priority in the first fetch priority table, allocating, by the server, memory in descending order of priorities in the first fetch priority table according to the following procedure:

querying, by the server, whether a NUMA node with the current query priority has free memory; if the NUMA node with the current query priority does not have free memory, updating, by the server, the first priority to a priority following the current query priority, and triggering the step of allocating memory according to the following procedure; if there is only one second NUMA node having free memory whose size is a second capacity in the NUMA node with the current query priority, determining, by the server, whether the second capacity is not less than the current to-be-allocated memory size; if the second capacity is not less than the current to-be-allocated memory size, allocating, by the server, memory whose size is the current to-be-allocated memory size to the first NUMA node from the second NUMA node, and ending the memory allocation procedure; and if the second capacity is less than the current to-be-allocated memory size, allocating, by the server, the memory whose size is the second capacity to the first NUMA node from the second NUMA node, updating the first capacity to the current to-be-allocated memory size minus the second capacity, updating the first priority to the priority following the current query priority, and triggering the step of allocating memory according to the following procedure.

In a possible design, in a fifth implementation of the first aspect of the embodiments of this application, after the step of querying, by the server, whether a NUMA node with the current query priority has free memory, the method further includes: if there is more than one third NUMA node having free memory in the NUMA node with the current query priority, allocating, by the server, memory from the third NUMA nodes according to the interleaved policy, where a size of the allocated memory is a third capacity; if the third capacity is equal to the current to-be-allocated memory size, ending the memory allocation procedure; and if the third capacity is less than the current to-be-allocated memory size, updating, by the server, the first capacity to the current to-be-allocated memory size minus the third capacity, updating the first priority to the priority following the current query priority, and triggering the step of allocating memory according to the following procedure.

In a possible design, in a sixth implementation of the first aspect of the embodiments of this application, after the step of querying, by the server, whether a NUMA node with the current query priority has free memory, the method further includes: if learning through querying that no NUMA node has free memory, determining, by the server, whether a memory release operation is performed, where the memory release operation indicates that temporarily unused memory is swapped to a hard disk buffer and if the memory release operation is not performed, performing the memory release operation, initializing the current to-be-allocated memory size and the current query priority, and triggering the step of allocating, by the server, memory in descending order of priorities in the first fetch priority table according to the following procedure.

In a possible design, in a seventh implementation of the first aspect of the embodiments of this application, before the step of allocating, by the server, memory from the third NUMA nodes according to the interleaved policy, the method further includes: determining, by the server, whether the current to-be-allocated memory size is greater than one memory page; if the current to-be-allocated memory size is greater than one memory page, triggering the step of allocating, by the server, memory from the third NUMA nodes according to the interleaved policy; and if the current to-be-allocated size is not greater than one memory page, randomly selecting, by the server, one third NUMA node from the third NUMA nodes to allocate memory, and ending the memory allocation procedure.

In a possible design, in an eighth implementation of the first aspect of the embodiments of this application, the node topology table is an $(N+M)\times(N+M)$ matrix S, N is a quantity of NUMA nodes in the server, M is a quantity of NCs in the server, the first N columns and N rows of the matrix S indicate the NUMA nodes, the last M columns and M rows of the matrix S indicate the NCs, a value in a $p^{th}$ row and a $q^{th}$ column of the matrix S indicates a connection relationship between a node p and a node q, and N, M, p, and q are all positive integers.

A second aspect of the embodiments of this application provides a server, including: an identification module, configured to identify a node topology table, where the node topology table includes a connection relationship between NUMA nodes, a connection relationship between a NUMA node and an NC, and a connection relationship between NCs in the server; a generation module, configured to generate fetch hop tables of the NUMA nodes based on the node topology table obtained by the identification module through identification, where a fetch hop table of a first NUMA node includes an NC hop count and a quick path interconnect QPI hop count of a shortest path through which the first NUMA node is connected to each of the other NUMA nodes, the NC hop count is a quantity of NCs through which the shortest path passes, and the QPI hop count is a quantity of NUMA nodes through which the shortest path passes; a calculation module, configured to calculate fetch priority tables of the NUMA nodes based on the fetch hop tables of the NUMA nodes generated by the generation module, where a first fetch priority table of the first NUMA node includes a priority of accessing each of the other NUMA nodes by the first NUMA node, a smaller NC hop count indicates a higher priority of accessing the NUMA node, and for a same NC hop count, a smaller QPI hop count indicates a higher priority of accessing the NUMA node; and an allocation module, configured to: when the first NUMA node applies for memory, allocate memory based on the first fetch priority table obtained by the calculation module through calculation, and for a higher priority, more preferentially allocate memory from a NUMA node corresponding to the priority.

In a possible design, in a first implementation of the second aspect of the embodiments of this application, the allocation module is further configured to: when there are a plurality of NUMA nodes with a same priority in the first fetch priority table, allocate memory from these NUMA nodes with the same priority according to an interleaved policy.

In a possible design, in a second implementation of the second aspect of the embodiments of this application, the generation module specifically includes: a read unit, configured to read the stored node topology table obtained by the identification module through identification; a first calculation unit, configured to calculate a shortest path from each NUMA node to each of the other NUMA nodes based on the node topology table read by the read unit, where the shortest path is a path with a smallest NC hop count in a preselected shortest path, and the preselected shortest path is a path with a smallest QPI hop count in a path from one NUMA node to another NUMA node; a second calculation unit, configured to calculate an NC hop count and a QPI hop count of each shortest path based on the shortest path from each NUMA node to each of the other NUMA nodes obtained by the first calculation unit through calculation; and a forming unit, configured to form the fetch hop tables of the NUMA nodes by using the NC hop count and the QPI hop count of the shortest path from each NUMA node to each of the other NUMA nodes obtained by the second calculation unit through calculation.

In a possible design, in a third implementation of the second aspect of the embodiments of this application, the calculation module specifically includes: a first sorting unit, configured to sort the NUMA nodes in the fetch hop tables in ascending order of NC hop counts in the fetch hop tables of the NUMA nodes, to obtain a first NUMA node sequence; a second sorting unit, configured to: for NUMA nodes with a same NC hop count in the first NUMA node sequence, sort the NUMA nodes in ascending order of QPI hop counts in the fetch hop tables, to obtain a second NUMA node sequence; and an assignment unit, configured to sequentially assign priorities to the NUMA nodes in the second NUMA node sequence in descending order of priorities, where priorities of NUMA nodes with a same NC hop count and a same QPI hop count are the same.

In a possible design, in a fourth implementation of the second aspect of the embodiments of this application, the allocation module specifically includes: a start unit, configured to: if a current to-be-allocated memory size is a first capacity, a current query priority is a first priority, and the first priority is a priority in the first fetch priority table, trigger a query unit in descending order of priorities in the first fetch priority table; the query unit, configured to query whether a NUMA node with the current query priority has free memory; a first update unit, configured to: when the NUMA node with the current query priority does not have free memory, update the first priority to a priority following the current query priority, and trigger the start unit; a first determining unit, configured to: when there is only one second NUMA node having free memory whose size is a second capacity in the NUMA node with the current query priority, determine whether the second capacity is not less than the current to-be-allocated memory size; a first allocation unit, configured to: when the second capacity is not less than the current to-be-allocated memory size, allocate memory whose size is the current to-be-allocated memory size to the first NUMA node from the second NUMA node, and trigger an end unit; a second update unit, configured to: when the second capacity is less than the current to-be-allocated memory size, allocate the memory whose size is the second capacity to the first NUMA node from the second NUMA node, update the first capacity to the current to-be-allocated memory size minus the second capacity, update the first priority to the priority following the current query priority, and trigger the start unit; and the end unit, configured to end the memory allocation procedure.

In a possible design, in a fifth implementation of the second aspect of the embodiments of this application, the allocation module further includes: a second allocation unit, configured to: when the query unit determines that there is more than one third NUMA node having free memory in the NUMA node with the current query priority, allocate memory from the third NUMA nodes according to the interleaved policy, where a size of the allocated memory is a third capacity; a first triggering unit, configured to: when the third capacity is equal to the current to-be-allocated memory size, trigger the end unit; and a second triggering unit, configured to: when the third capacity is less than the current to-be-allocated memory size, update the first capacity to the current to-be-allocated memory size minus the third capacity, update the first priority to the priority following the current query priority, and trigger the start unit.

In a possible design, in a sixth implementation of the second aspect of the embodiments of this application, the allocation module further includes: a second determining unit, configured to: when the query unit learns through querying that no NUMA node has free memory, determine whether a memory release operation is performed, where the memory release operation indicates that temporarily unused memory is swapped to a hard disk buffer; and a release execution unit, configured to: when the second determining unit determines that the memory release operation is not performed, perform the memory release operation, initialize the current to-be-allocated memory size and the current query priority, and trigger the start unit.

In a possible design, in a seventh implementation of the second aspect of the embodiments of this application, the second allocation unit specifically includes: a determining subunit, configured to: when the query unit determines that there is more than one third NUMA node having free memory in the NUMA node with the current query priority, determine whether the current to-be-allocated memory size is greater than one memory page; a first allocation subunit, configured to: when the current to-be-allocated memory size is greater than one memory page, allocate memory from the third NUMA nodes according to the interleaved policy; and a second allocation subunit, configured to: when the current to-be-allocated size is not greater than one memory page, randomly select one third NUMA node from the third NUMA nodes to allocate memory, and trigger the end unit.

A third aspect of the embodiments of this application provides a computer-readable storage medium, including an instruction, where when the instruction is run on a computer, the computer is enabled to perform the steps of the method according to the foregoing aspects.

A fourth aspect of the embodiments of this application provides a computer program product including an instruction, where when the instruction is run on a computer, the computer is enabled to perform the method according to the foregoing aspects.

It can be learned from the foregoing technical solutions that the embodiments of this application have the following advantages: In the embodiments of this application, the server identifies the node topology table. The node topology table not only includes the connection relationship between NUMA nodes, but also includes the connection relationship between a NUMA node and an NC and the connection relationship between NCs. The server generates the fetch hop tables of the NUMA nodes based on the node topology table. A hop table of each NUMA node includes both a QPI hop count and an NC hop count of a shortest path through which the NUMA node is connected to each of the other NUMA nodes. The server then calculates the fetch priorities of the NUMA nodes based on the fetch hop tables of the NUMA nodes, and uses an NC hop count as an important parameter for fetch priority calculation, where a smaller NC hop count indicates a higher fetch priority. When a NUMA node applies for memory, the server allocates memory based on the fetch priority table, and for a higher priority, more preferentially allocates memory from a NUMA node corresponding to the priority. Therefore, because the NC hop count is used as the important parameter for fetch priority calculation, an opportunity of allocating memory across NCs is reduced during memory allocation, thereby reducing a fetch latency caused by an NC and improving performance of the server.

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by persons skilled in the art based on the embodiments of this application without creative efforts shall fall within the protection scope of this application.

It should be understood that although terms "first" and "second" may be used in the embodiments of this application to describe NUMA nodes or priorities, the NUMA nodes or priorities are not limited by these terms. These terms are merely used to differentiate the NUMA nodes or priorities. For example, without departing from the scope of the embodiments of this application, a first NUMA node may also be referred to as a second NUMA node, and similarly, a second NUMA node may also be referred to as a first NUMA node. Likewise, a second priority may also be referred to as a third priority or the like. This is not limited in the embodiments of this application.

Figure 1:
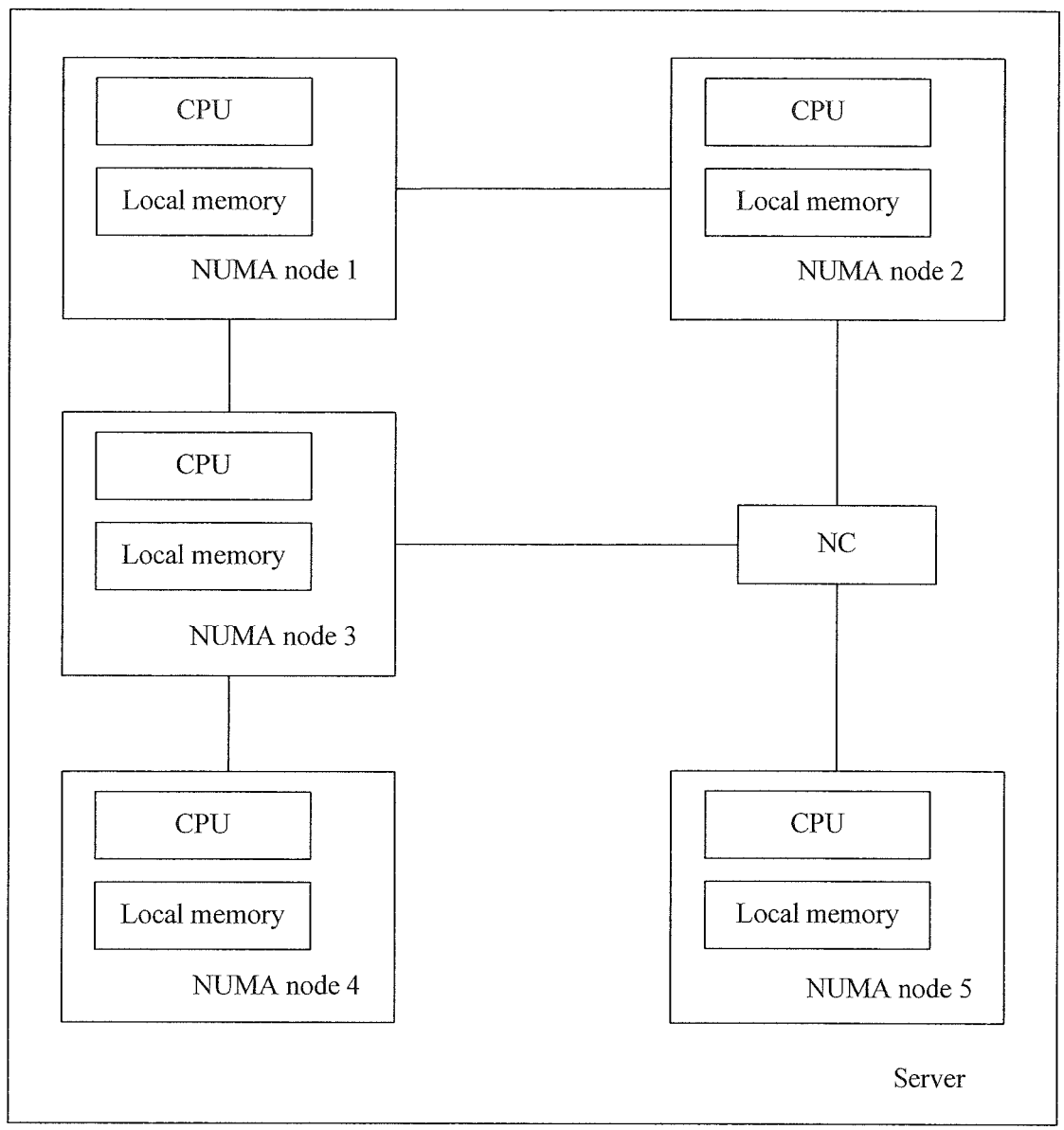
FIG. 1 is a schematic diagram of an application scenario of a memory allocation method according to an embodiment of this application.

A memory allocation method and a system in the embodiments of this application are applied to a server with a NUMA architecture. FIG. 1 is a schematic diagram of an application scenario of the memory allocation method. A server includes NUMA nodes 1 to 5 that are connected by using a high-speed interconnection network, and each NUMA node includes one group of a CPU and local memory. The NUMA nodes may be directly connected by using QPI, for example, a connection between a NUMA node 1 and a NUMA node 2, a connection between the NUMA node 1 and a NUMA node 3, and a connection between the NUMA node 3 and a NUMA node 4; or may be connected by using an NC 6, for example, a connection between the NUMA node 2 and a NUMA node 5, and a connection between the NUMA node 3 and the NUMA node 5. It may be understood that FIG. 1 is only the schematic diagram. In actual application, a quantity of CPUs of each NUMA node is not limited, and the server may include more or fewer NUMA nodes, and may also include more or fewer NCs. This is not limited herein.

Figure 2:
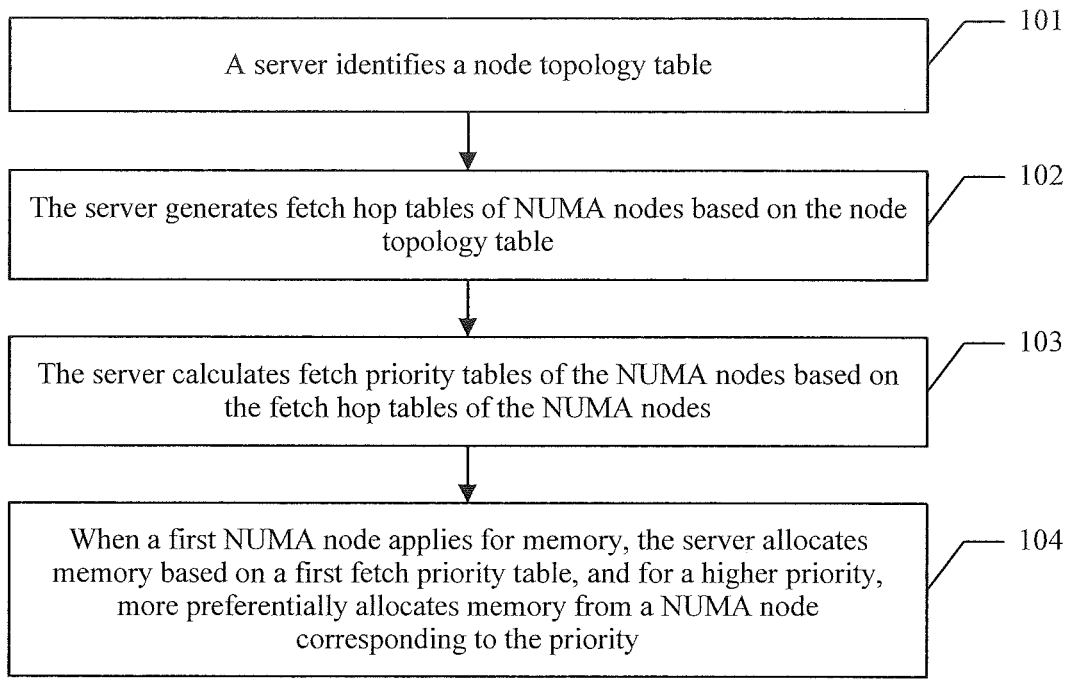
FIG. 2 is a schematic flowchart of a memory allocation method according to an embodiment of this application.

Referring to FIG. 2, the following describes a memory allocation method in an embodiment of this application.

101. A server identifies a node topology table.

The server identifies the node topology table, where the node topology table includes a connection relationship between NUMA nodes, a connection relationship between a NUMA node and a node controller NC, and a connection relationship between NCs in the server.

It may be understood that the node topology table may have a plurality of representation forms and storage forms. This is not limited herein.

The node topology table may be an (N+M)×(N+M) matrix S, N is a quantity of NUMA nodes in the server, M is a quantity of NCs in the server, the first N columns and N rows of the matrix S indicate the NUMA nodes, the last M columns and M rows of the matrix S indicate the NCs, a value in a $p^{th}$ row and a $q^{th}$ column of the matrix S indicates a connection relationship between a node p and a node q, and N, M, p, and q are all positive integers.

For understanding, refer to Table 1. Assuming that there are N NUMA nodes and M NC nodes in a system, the node topology table is shown in Table 1. In Table 1, 0 to N−1 indicate NUMA nodes, and N to (N+(M−1)) indicates NC nodes. S[p][q] indicates a value in a $p^{th}$ row and a $q^{th}$ column of the matrix. If S[p][q]=1, it indicates that the node p is directly connected to the node q. If p=q, S[p][q]=0.

TABLE 1

|   | 0 | 1 | ... | q | ... | N − 1 | N | ... | N + (M − 1) |
|---|---|---|-----|---|-----|-------|---|-----|-------------|
| 0 | 0 | 1 | ... | 1 | ... | 0 | 1 | ... | 0 |
| 1 | 1 | 0 | ... | 0 | ... | 1 | 0 | ... | 1 |
| ... | ... | ... | ... | ... | ... | ... | ... | ... | ... |
| p | 1 | 0 |  | 1 | ... | 0 | 1 | ... | 0 |
| ... | ... | ... | ... | ... | ... | ... | ... | ... | ... |
| N − 1 | 0 | 0 | ... | 1 | ... | 0 | 0 | ... | 1 |
| N | 1 | 0 | ... | 1 | ... | 0 | 0 | ... | 0 |
| ... | ... | ... | ... | ... | ... | ... | ... | ... | ... |
| N + (M − 1) | 0 | 1 | ... | 0 |  | 1 |  | ... | 0 |

It may be understood that if the node topology table is stored in the manner shown in Table 1, for any node p, a total of N+M bits are required for storing interconnection relationships between the node p and the other nodes. If a bit corresponding to a $q^{th}$ node is 1, it indicates that the node p is directly connected to the node q; or if a bit corresponding to a $q^{th}$ node is not 1, the node p is not connected to the node q. Therefore, if there are N+M nodes in the system, only (N+M)×(N+M)/8 bytes are needed to store a topology structure of the NUMA nodes and the NCs in the entire server.

102. The server generates fetch hop tables of NUMA nodes based on the node topology table.

The server generates the fetch hop tables of the NUMA nodes based on the node topology table obtained through identification. A fetch hop table of a first NUMA node includes an NC hop count and a quick path interconnect QPI hop count of a shortest path through which the first NUMA node is connected to each of the other NUMA nodes, the NC hop count is a quantity of NCs through which the shortest path passes, and the QPI hop count is a quantity of NUMA nodes through which the shortest path passes.

It may be understood that if there are N NUMA nodes in the server, N fetch hop tables respectively corresponding to the NUMA nodes may be generated, and the first NUMA node may be any one of the NUMA nodes. This is not limited herein.

Figure 3:
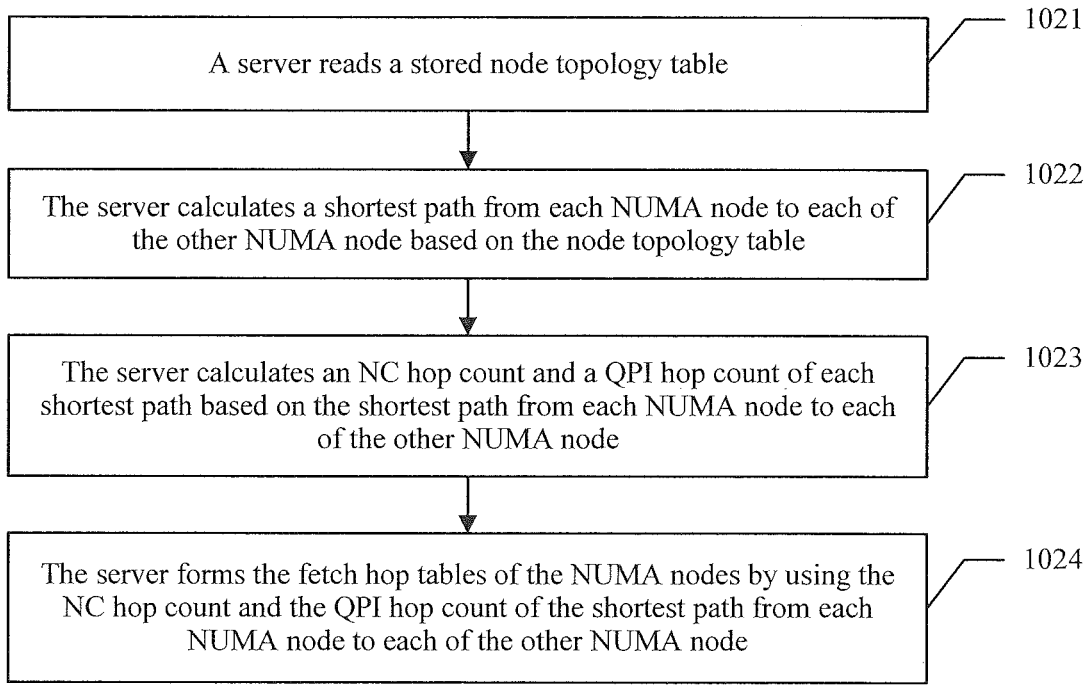
FIG. 3 is a schematic flowchart of generating a fetch hop table according to an embodiment of this application.

Specifically, there may be a plurality of procedures of generating the fetch hop tables based on the node topology table. For ease of understanding, referring to FIG. 3, the following uses one procedure of generating the fetch hop tables as an example for description.

1021. The server reads the stored node topology table.

1022. The server calculates a shortest path from each NUMA node to each of the other NUMA nodes based on the node topology table.

The shortest path is a path with a smallest NC hop count in a preselected shortest path, and the preselected shortest path is a path with a smallest QPI hop count in a path from one NUMA node to another NUMA node.

For example, a shortest path from any NUMA node p to any other NUMA node q is set to $L_{p \to q}$, and it is assumed that $L_{p \to q} = \{p, n_0, \ldots n_i, \ldots n_f, q\}$, where p≠q\/I. Assuming that there are a plurality of preselected shortest paths from p to q, a set of the preselected shortest paths is $L_q^p = \{L_{p \to q}^0, \ldots L_{p \to q}^j, \ldots, L_{p \to q}^J\}$, where J≥0, and a path $L_{p \to q}^x$ with a smallest NC hop count is selected from $L_q^p$, $L_{p \to q}^x$ is the shortest path from p to q, and $L_{p \to q}^x$ is set to $L_{p \to q}$. According to this method, shortest paths from the NUMA node p to all other NUMA nodes may be calculated, and may be recorded as $L_p = \{L_{p \to 0}, \ldots L_{p \to q}, \ldots, L_{p \to N-1}\}$, where $L_{p \to q}$ indicates the shortest path from the NUMA node p to the NUMA node q, and $L_{p \to q} = \{p, n_0, \ldots n_i, \ldots, n_f, q\}$. Further, according to the method, the shortest path from each NUMA node to each of the other NUMA nodes may be calculated.

1023. The server calculates an NC hop count and a QPI hop count of each shortest path based on the shortest path from each NUMA node to each of the other NUMA nodes.

Figure 4:
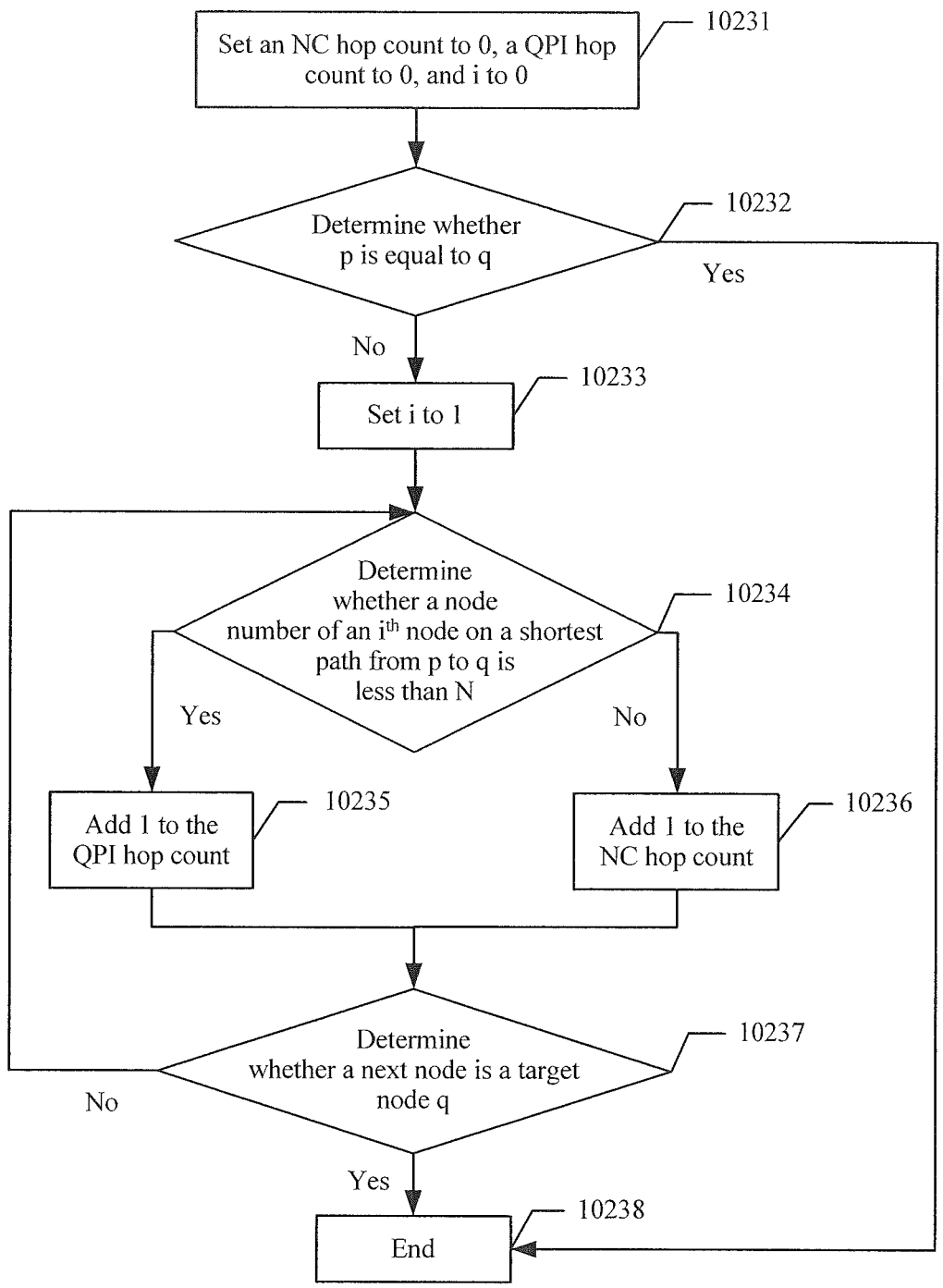
FIG. 4 is a schematic flowchart of calculating an NC hop count and a QPI hop count according to an embodiment of this application.

The NC hop count and the QPI hop count of each shortest path may be calculated based on the shortest path from each NUMA node to each of the other NUMA nodes. For ease of understanding, referring to FIG. 4, the following uses one calculation manner as an example for description.

It should be noted that the calculation method is based on the node topology table shown in Table 1 in step 101.

10231. Set $H_{nc}$ to 0, $H_{qpi}$ to 0, and i to 0.

$H_{nc}$ indicates an NC hop count, $H_{qpi}$ indicates a QPI hop count, i is used to index $L_{pq}$, and $L_{pq}$ indicates a shortest path from p to q.

For example, $L_{p \to q} = \{p, n_0, \ldots, n_i, \ldots, n_f, q\}$.

10232. Determine whether p is equal to q.

If p is equal to q, it indicates that it is local fetch. Therefore, $H_{nc}=0$, $H_{qpi}=0$, and step 10238 is performed. If p is not equal to q, step 10233 is performed.

10233. Set i to 1, and perform step 10234.

10234. Determine whether $L_{pq}[i]$ is less than N.

It should be noted that N indicates N NUMA nodes in the server and $L_{pq}[i]$ indicates a node number of an $i^{th}$ node on the shortest path $L_{pq}$. It can be learned from the node topology diagram shown in Table 1 that nodes numbered 0 to N−1 are NUMA nodes. Therefore:

if $L_{pq}[i]<N$, it indicates that $L_{pq}[i]$ is a NUMA node, and step 10235 is performed; or if $L_{pq}[i]≥N$, it indicates that $L_{pq}[i]$ is an NC node, and step 10236 is performed.

10235. Add 1 to $H_{qpi}$, and perform step 10237.

10236. Add 1 to $H_{nc}$, and perform step 10237.

10237. Determine whether a next node is a target node q.

To be specific, it is determined whether $L_{pq}[++i]$ is equal to q. If $L_{pq}[++i]$ is equal to q, it indicates that the node q is reached, and step 10238 is performed; or if $L_{pq}[++i]$ is not equal to q, it indicates that the node q is not reached, and step 10234 is performed.

10238. End.

The QPI hop count $H_{qpi}$ and the NC hop count $H_{nc}$ of the shortest path $L_{pq}$ can be obtained after all nodes on the shortest path from the node p to the node q are traversed by using the foregoing procedure. Further, QPI hop counts $H_{qpi}$ and NC hop counts $H_{nc}$ from the node p to all the other NUMA nodes can be obtained by using the procedure. Further, the NC hop count and the QPI hop count of the shortest path from each NUMA node to each of the other NUMA nodes can be obtained by using the procedure.

1024. The server forms the fetch hop tables of the NUMA nodes by using the NC hop count and the QPI hop count of the shortest path from each NUMA node to each of the other NUMA nodes.

After the QPI hop counts $H_{qpi}$ and the NC hop counts $H_{nc}$ from the node p to all the other NUMA nodes are obtained, a fetch hop table of the node p may be formed. A representation manner may be shown in Table 2:

TABLE 2

| NUMA node | QPI hop count | NC hop count |
|---|---|---|
| 0 | $H_{qpi}^{0}$ | $H_{nc}^{0}$ |
| 1 | $H_{qpi}^{1}$ | $H_{nc}^{1}$ |
| ... | ... | ... |
| q | $H_{qpi}^{q}$ | $H_{nc}^{q}$ |
| ... | ... | ... |
| N − 1 | $H_{qpi}^{N-1}$ | $H_{nc}^{N-1}$ |

It may be understood that a fetch hop table of each of the other NUMA nodes may be formed by using the same method.

103. The server calculates fetch priority tables of the NUMA nodes based on the fetch hop tables of the NUMA nodes.

A first fetch priority table of the first NUMA node includes a priority of accessing each of the other NUMA nodes by the first NUMA node, a smaller NC hop count indicates a higher priority of accessing the NUMA node, and for a same NC hop count, a smaller QPI hop count indicates a higher priority of accessing the NUMA node.

Figure 5:
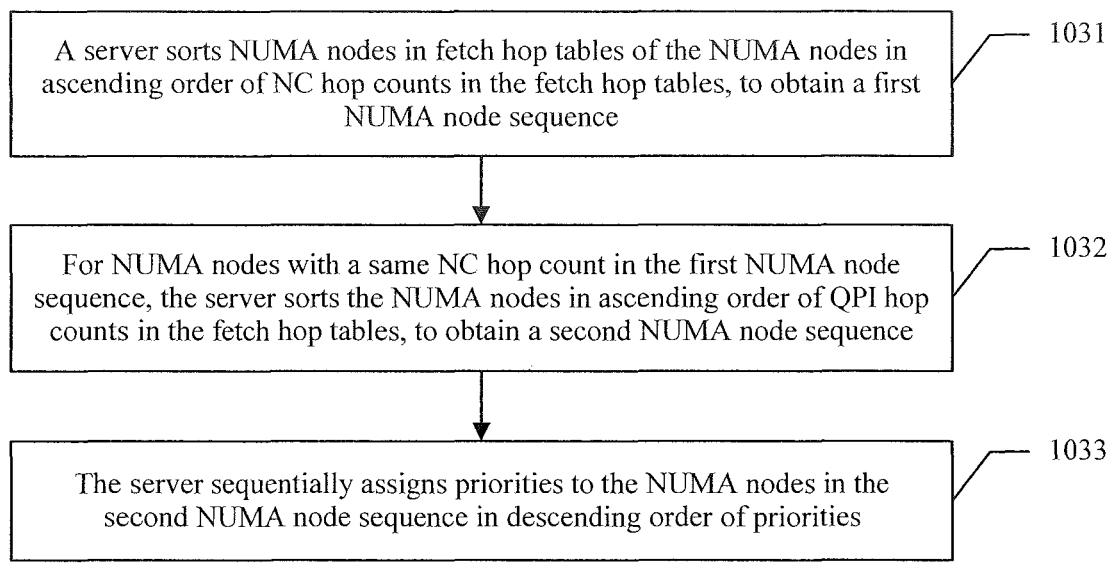
FIG. 5 is a schematic flowchart of calculating fetch priorities according to an embodiment of this application.

It may be understood that there are a plurality of manners of calculating fetch priorities of the NUMA nodes. For ease of understanding, referring to FIG. 5, the following uses one manner of calculating the fetch priorities as an example for description.

1031. The server sorts the NUMA nodes in the fetch hop tables in ascending order of NC hop counts in the fetch hop tables of the NUMA nodes, to obtain a first NUMA node sequence.

1032. For NUMA nodes with a same NC hop count in the first NUMA node sequence, the server sorts the NUMA nodes in ascending order of QPI hop counts in the fetch hop tables, to obtain a second NUMA node sequence.

1033. The server sequentially assigns priorities to the NUMA nodes in the second NUMA node sequence in descending order of priorities.

Priorities of NUMA nodes with a same NC hop count and a same QPI hop count are the same.

Figure 6:
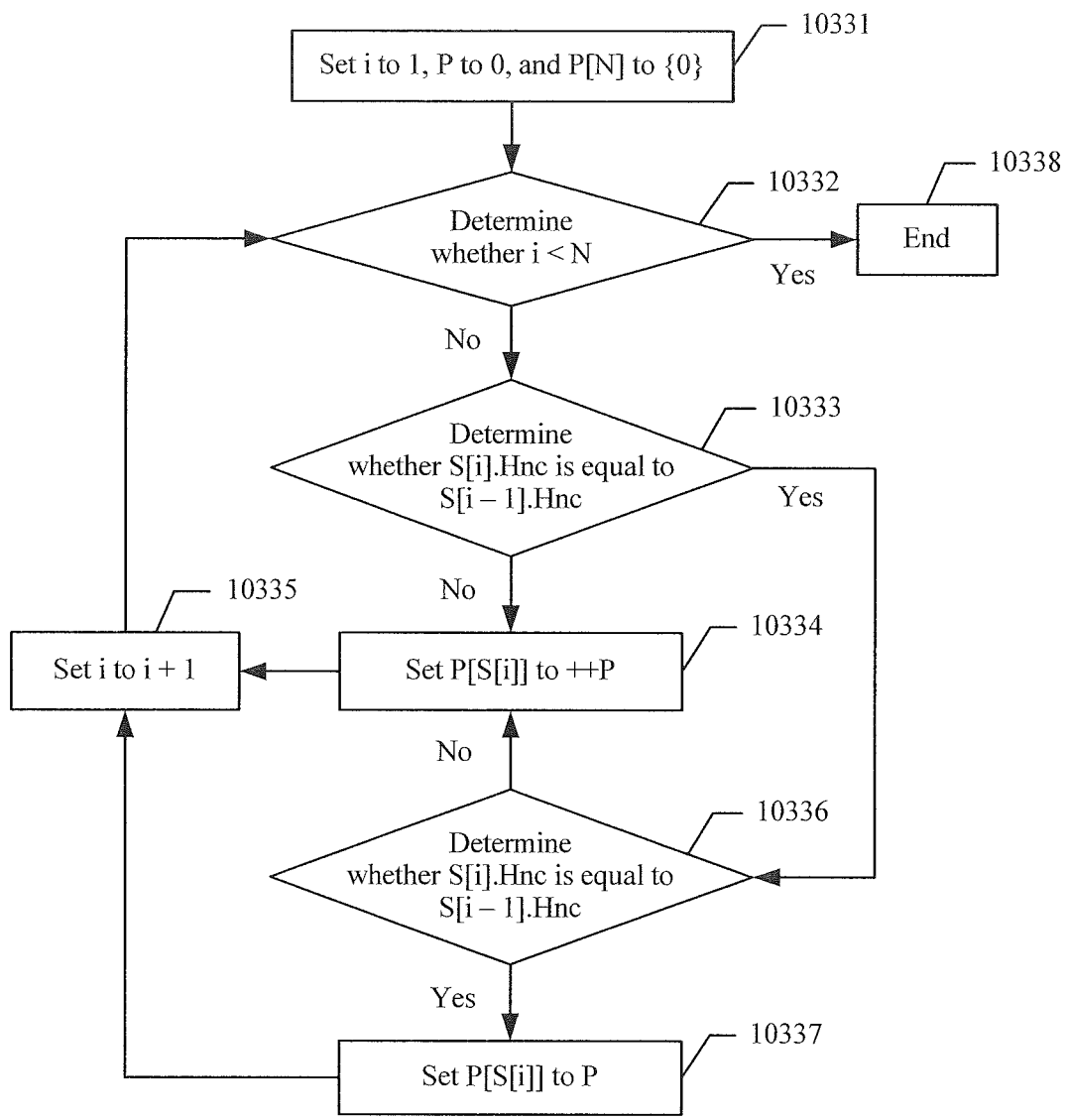
FIG. 6 is a schematic flowchart of assigning priorities according to an embodiment of this application.

There may be a plurality of specific calculation manners of assigning the priorities. For ease of understanding, referring to FIG. 6, the following uses one calculation manner of assigning the priorities as an example for description.

It is assumed that the obtained second NUMA node sequence is S[N].

10331. Set i to 1, P to 0, and P[N] to {0}.

i is used as an index of a NUMA node in S[N], P indicates a priority, and P[N] is used to record a priority of each NUMA node.

10332. Determine whether i<N.

If i is not less than N, it indicates that a priority has been generated for each NUMA, the entire process ends, and step 10338 is performed to end the process; or if i<N, step 10333 is performed.

10333. Determine whether S[i].Hnc is equal to S[i−1].Hnc.

S[i].Hnc indicates a quantity of NC hops from a NUMA node numbered S[i] to a NUMA node numbered p.

If S[i].Hnc is equal to S[i−1].Hnc, it indicates that an NC hop count of a NUMA node numbered i is the same as an NC hop count of a NUMA node numbered i−1. QPI hop counts need to be compared, and step 10336 is performed.

If S[i].Hnc is not equal to S[i−1].Hnc, an NC hop count of a NUMA node numbered i is greater than an NC hop count of a NUMA node numbered i−1 according to an arrangement rule of the second NUMA node sequence, and step 10334 is performed.

10334. Set P[S[i]] to ++P.

Because the quantity of NC hops from S[i] to p is increased, a value of P is increased, a value of a fetch priority corresponding to S[i] is also increased, and step 10335 is performed.

Because the quantity of NC hops from S[i] to p is the same, but a QPI hop count is increased, a value of P is increased, a value of a fetch priority corresponding to S[i] is also increased, and step 10335 is performed.

10335. Set i to i+1, and perform step 10332 to calculate a fetch priority of a next NUMA.

10336. Determine whether $S[i].H_{qpi}$ is equal to $S[i-1].H_{qpi}$.

$S[i].H_{qpi}$ indicates a quantity of QPI hops from the NUMA node numbered S[i] to an SKT numbered p.

If $S[i].H_{qpi}$ is equal to $S[i-1].H_{qpi}$, it indicates that both the NC hop count and the QPI hop count of the NUMA node numbered i are the same as the NC hop count and a QPI hop count of the NUMA node numbered i−1, priorities should also be equal, and step 10337 is performed.

If $S[i].H_{qpi}$ is not equal to $S[i-1].H_{qpi}$, the QPI hop count of the NUMA node numbered i is greater than a QPI hop count of the NUMA node numbered i−1 according to the arrangement rule of the second NUMA node sequence, and step 10334 is performed.

10337. Set P[S[i]] to P.

Because a quantity of NC hops and a quantity of QPI hops from a current SKT to p are equal to a quantity of NC hops and a quantity of QPI hops from a previous SKT to p, fetch priorities of the current SKT and the previous SKT are the same. P[S[i]] is set to P, and step 10335 is performed.

10338. End.

A fetch priority of accessing each of the other NUMA nodes by the NUMA node numbered p can be obtained through calculation by using the foregoing algorithm. A priority of accessing the NUMA node numbered q by the NUMA node numbered p is recorded as P[q], and a fetch priority table of the NUMA node p may be obtained. A representation manner may be shown in Table 3:

TABLE 3

| NUMA node | QPI hop count | NC hop count | Fetch priority |
|---|---|---|---|
| 0 | $H_{qpi}^{0}$ | $H_{nc}^{0}$ | P[0] |
| 1 | $H_{qpi}^{1}$ | $H_{nc}^{1}$ | P[1] |
| ... | ... | ... | ... |
| q | $H_{qpi}^{q}$ | $H_{nc}^{q}$ | P[q] |
| ... | ... | ... | ... |
| N − 1 | $H_{qpi}^{N-1}$ | $H_{nc}^{N-1}$ | P[N − 1] |

It may be understood that a fetch priority table of each of the other NUMA nodes may be obtained by using the same method.

104. When a first NUMA node applies for memory, the server allocates memory based on a first fetch priority table, and for a higher priority, more preferentially allocates memory from a NUMA node corresponding to the priority.

If there are a plurality of NUMA nodes with a same priority in the first fetch priority table, the server allocates memory from these NUMA nodes with the same priority according to an interleaved policy.

In the prior art, a server allocates memory to an application by using a local policy or an interleaved policy. Although the local policy can reduce latency overheads caused by remote fetch, excessive local fetch reduces fetch parallelism, and may cause fetch congestion, and latency overheads caused by the local fetch may be greater than the latency overheads caused by the remote fetch. If memory is allocated by using only the interleaved policy, although fetch parallelism may be maximized, an amount of remote fetch is greatly increased, and as a result, local fetch occupies only 1/N of an amount of fetch, where N is a quantity of NUMA nodes. Consequently, a problem of a remote fetch latency is highlighted. In this solution, memory is allocated based on priorities in a fetch priority table, and for a same priority, the interleaved policy is used for allocation. Therefore, fetch parallelism is considered when local fetch is preferentially performed, so that an amount of remote fetch is reduced, fetch parallelism is increased, occurrence of fetch congestion is reduced, and system performance is improved.

It may be understood that there are a plurality of specific manners of allocating memory based on priorities. For ease of understanding, one manner is used as an example for description.

1. If a current to-be-allocated memory size is a first capacity, a current query priority is a first priority, and the first priority is a priority in the first fetch priority table, the server allocates memory in descending order of priorities in the first fetch priority table according to the following procedure:

2. The server queries whether a NUMA node with the current query priority has free memory.

3. If learning through querying that no NUMA node has free memory, the server determines whether a memory release operation is performed, where the memory release operation indicates that temporarily unused memory is swapped to a hard disk buffer.

4. If the memory release operation is not performed, the memory release operation is performed, the current to-be-allocated memory size and the current query priority are initialized, and step 1 is triggered.

5. If the NUMA node with the current query priority does not have free memory, the server updates the first priority to a priority following the current query priority, and triggers step 1.

6. If there is only one second NUMA node having free memory whose size is a second capacity in the NUMA node with the current query priority, the server determines whether the second capacity is not less than the current to-be-allocated memory size.

7. If the second capacity is not less than the current to-be-allocated memory size, the server allocates memory whose size is the current to-be-allocated memory size to the first NUMA node from the second NUMA node, and ends the memory allocation procedure.

8. If the second capacity is less than the current to-be-allocated memory size, the server allocates the memory whose size is the second capacity to the first NUMA node from the second NUMA node, updates the first capacity to the current to-be-allocated memory size minus the second capacity, updates the first priority to the priority following the current query priority, and triggers step 1.

9. If there is more than one third NUMA node having free memory in the NUMA node with the current query priority, the server allocates memory from the third NUMA nodes according to the interleaved policy, where a size of the allocated memory is a third capacity.

If there is more than one third NUMA node having free memory in the NUMA node with the current query priority, the server may determine whether the current to-be-allocated memory size is greater than one memory page.

If the current to-be-allocated memory size is greater than one memory page, the step of allocating, by the server, memory from the third NUMA nodes according to the interleaved policy is triggered.

If the current to-be-allocated size is not greater than one memory page, the server randomly selects one third NUMA node from the third NUMA nodes to allocate memory, and ends the memory allocation procedure.

10. If the third capacity is equal to the current to-be-allocated memory size, the memory allocation procedure is ended.

11. If the third capacity is less than the current to-be-allocated memory size, the server updates the first capacity to the current to-be-allocated memory size minus the third capacity, updates the first priority to the priority following the current query priority, and triggers step 1.

Figure 7A:
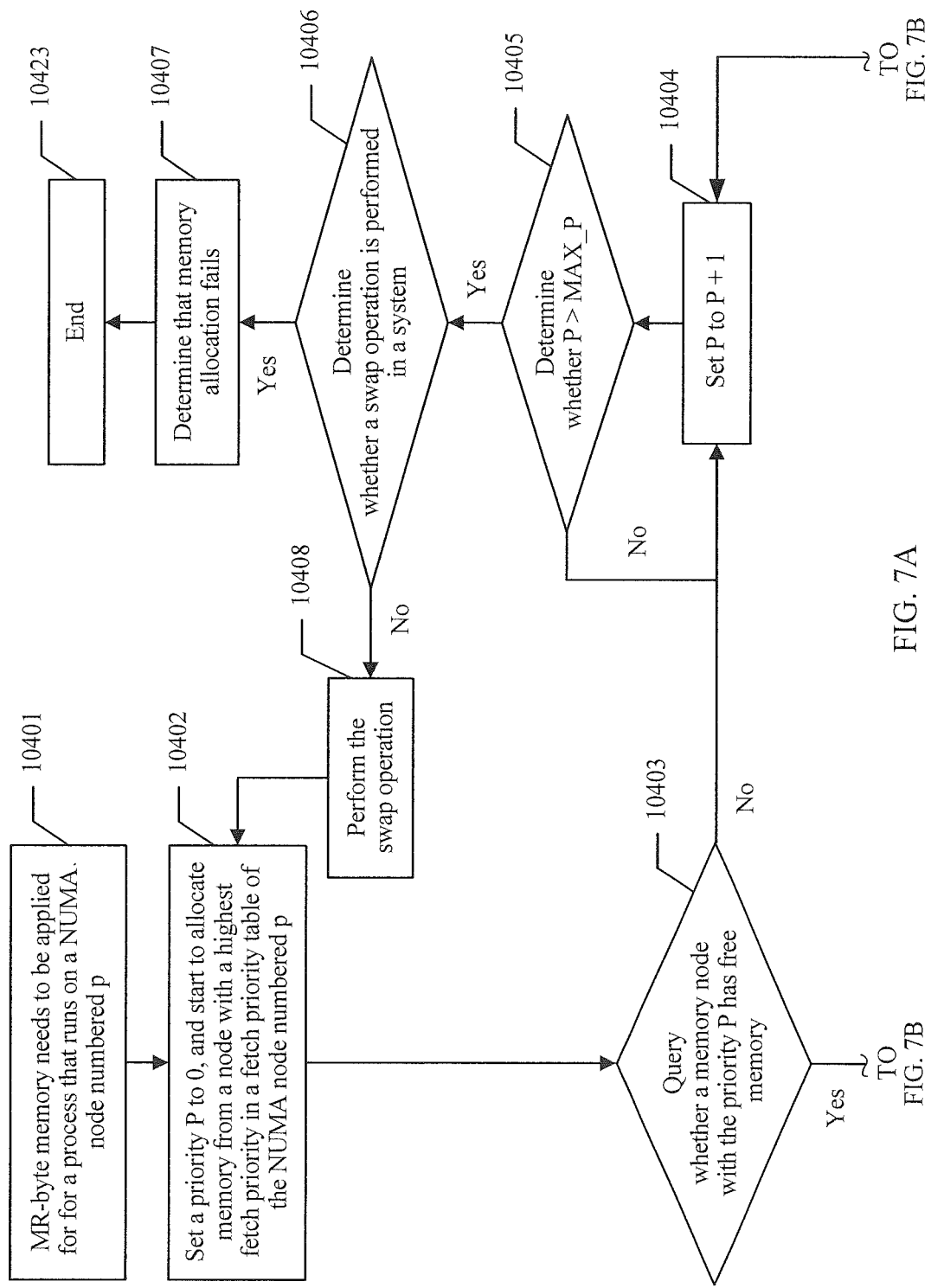
FIG. 7A, FIG. 7B, and FIG. 7C are schematic flowcharts of allocating memory based on priorities according to an embodiment of this application.
Figure 7B:
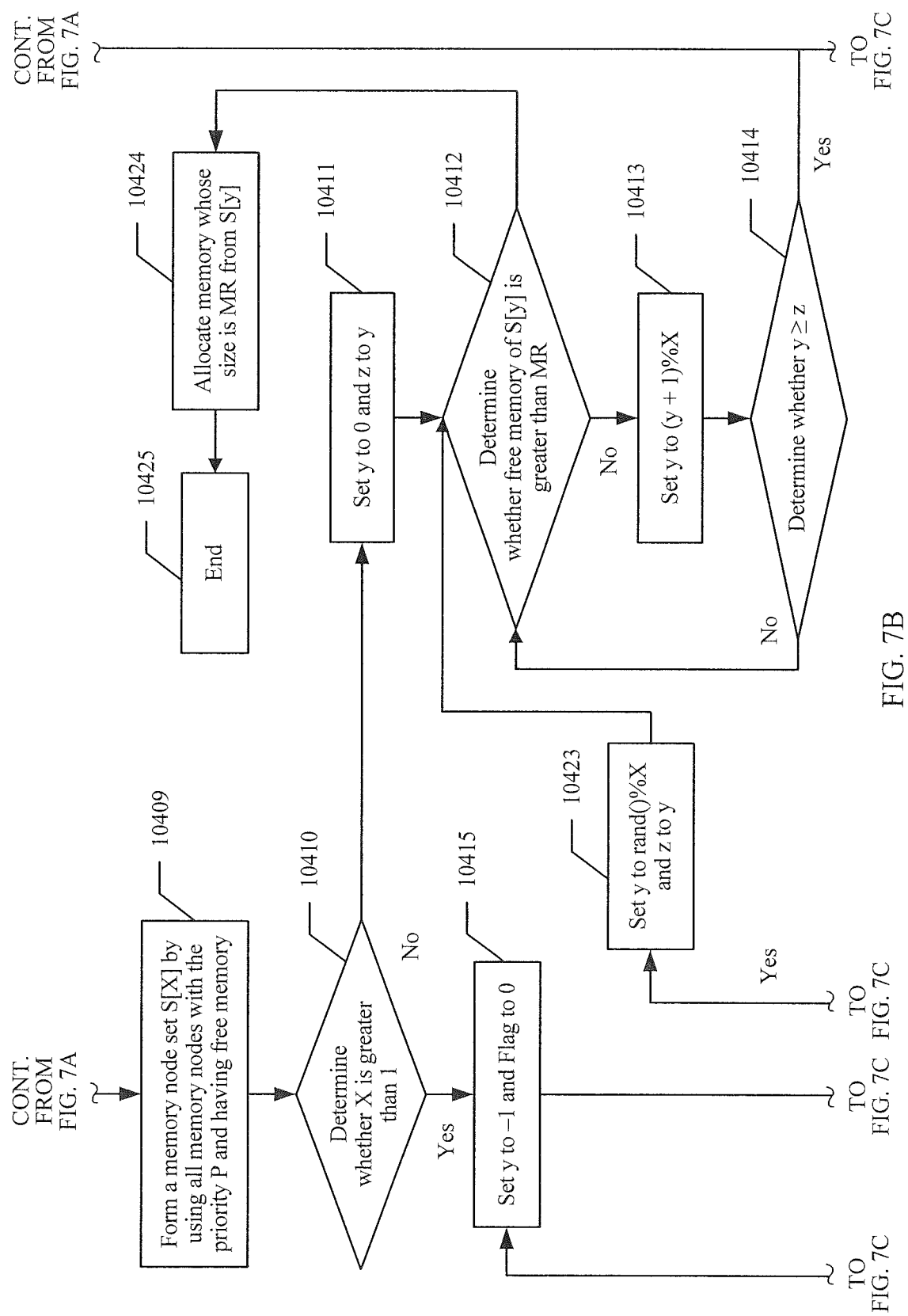
Figure 7C:
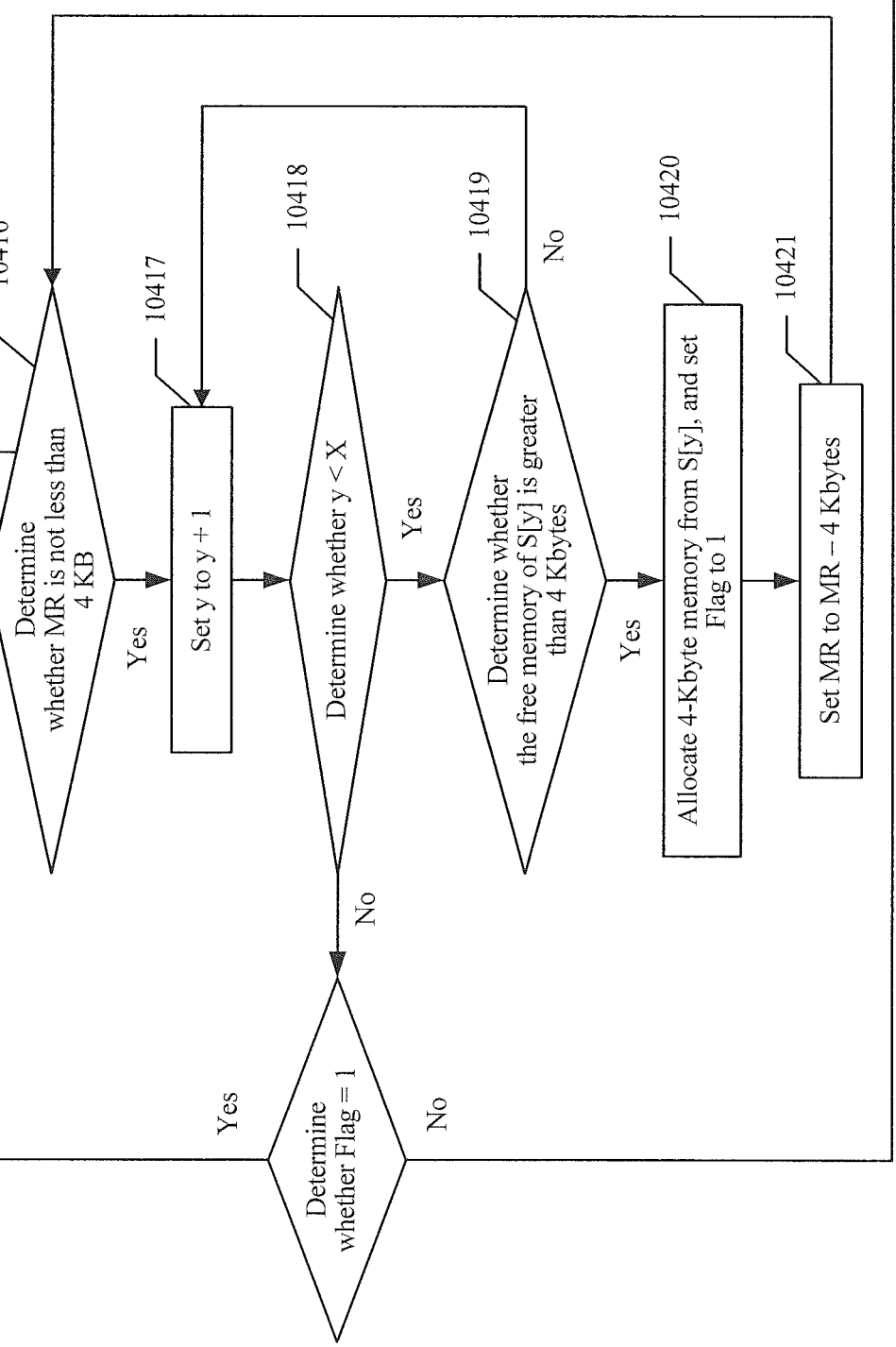

The foregoing describes one manner of allocating memory based on priorities. For ease of understanding, referring to FIG. 7A, FIG. 7B, and FIG. 7C, the following describes in detail the manner of allocating memory based on priorities with reference to a specific scenario.

10401. MR-byte memory needs to be applied for for a process that runs on a NUMA node numbered p.

10402. Set a priority P to 0, and start to allocate memory from a node with a highest fetch priority in a fetch priority table of the NUMA node numbered p.

P=0 indicates that memory is allocated from local memory.

10403. Query whether a memory node with the priority P has free memory.

If the NUMA node with the priority P does not have free memory, step 10404 is performed.

If the NUMA node with the priority P has free memory, step 10409 is performed.

10404. Set P to P+1, and perform step 10405.

10405. Determine whether P>MAX_P.

If P>MAX_P, it indicates that all NUMA nodes have been queried and step 10406 is performed.

If P≤MAX_P, step 10404 is performed.

10406. Determine whether a swap operation is performed in a system.

The swap operation means that temporarily unused memory is swapped to a hard disk buffer.

If the swap operation is performed, it indicates that no memory is available in the system, and step 10407 is performed.

If the swap operation is not performed, step 10408 is performed.

10407. Determine that memory allocation fails, and perform step 10423 after corresponding processing is performed.

10408. Perform the swap operation.

There is no free memory in the system. The temporarily unused memory is swapped to the hard disk buffer by using the swap operation, and a part of the memory is released. Then, step 10402 is performed.

10409. Form a memory node set S[X] by using all memory nodes with the priority P and having free memory.

X indicates that there are X memory nodes with the priority P in total.

10410. Determine whether X is greater than 1.

If X is equal to 1, it indicates that only one memory node with the priority P is available for memory allocation, y is used to indicate an index of the set S, and step 10411 is performed.

If X is greater than 1, step 10415 is performed.

10411. Set y to 0 and z to y, and perform step 10412.

y is used to indicate the index of the set S.

10412. Determine whether free memory of S[y] is greater than MR.

If the free memory of S[y] is greater than MR, step 10424 is performed.

If the free memory of S[y] is not greater than MR, step 10413 is performed.

10413. Set y to (y+1)% X, and perform step 10414.

10414. Determine whether y≥z.

If y≥z, it indicates that all the memory nodes with the priority P are traversed, and there is no sufficient memory for allocation in this case. Therefore, a memory node with a lower priority needs to be queried, that is, step 10404 is performed.

If y<z, step 10412 is performed.

10415. Set y to −1 and Flag to 0.

If X is greater than 1, it indicates that a plurality of memory nodes with the priority P are available for allocation. In this case, memory is allocated from each memory node with the priority P through polling in an interleaved manner, and a unit for each allocation is one memory page, that is, 4 KB; y is set to −1 and Flag is set to 0, where y is the index of S, and Flag indicates whether a page is allocated in a current polling process. If a page is allocated in the entire polling process, Flag is set to 1. If no page is allocated in the entire polling process, Flag is 0, it indicates that no page is allocated in the entire polling process, and therefore, it indicates that the memory node with the priority P does not have memory that meets a requirement, and step 10416 is performed.

10416. Determine whether MR is not less than 4 KB.

If MR is not less than 4 KB, step 10417 is performed.

If MR is less than 4 KB, memory that needs to be allocated is less than or equal to one page, and step 10423 is performed.

10417. Set y to y+1, and perform step 10418.

10418. Determine whether y<X.

If y<X, it indicates that polling on all the memory nodes with the priority P is not completed, and step 10419 is performed.

If y≥X, it indicates that all the memory nodes with the priority P have been polled, and step 10422 is performed.

10419. Determine whether the free memory of S[y] is greater than 4 Kbytes.

If the free memory of S[y] is greater than 4 Kbytes, step 10420 is performed.

If the free memory of S[y] is not greater than 4 Kbytes, the free memory of S[y] is insufficient for one page, and step 10417 is performed.

10420. Allocate 4-Kbyte memory from S[y], and set Flag to 1.

It indicates that memory is allocated once for current polling, and step 10421 is performed.

10421. Set MR to MR−4 Kbytes, and perform step 10416.

10422. Determine whether Flag=1.

If Flag is equal to 1, it indicates that memory is allocated once for previous polling and it indicates that the memory node with the priority P still has free memory. Therefore, step 10415 is performed to start next polling.

If Flag is not equal to 1, it indicates that no memory is allocated for previous polling and it indicates that the memory node with the priority P does not have free memory, and memory needs to be allocated from a memory node with a lower priority. Therefore, step 10404 is performed.

10423. Set y to rand( ) % X and z to y.

If MR is less than or equal to 4 Kbytes, sufficient memory can be allocated by selecting one node from the set S of memory nodes with the priority of P. To avoid a case in which memory is always allocated from some nodes when this case frequently occurs, y is set to rand( )% X, and it indicates that a memory node is randomly selected from S, to allocate memory. In addition, z is set to y, and then step 10412 is performed.

10424. Allocate memory whose size is MR from S[y], and perform step 10425.

10425. End.

In this embodiment of this application, the server identifies the node topology table. The node topology table not only includes the connection relationship between NUMA nodes, but also includes the connection relationship between a NUMA node and an NC and the connection relationship between NCs. The server generates the fetch hop tables of the NUMA nodes based on the node topology table. A hop table of each NUMA node includes both a QPI hop count and an NC hop count of a shortest path through which the NUMA node is connected to each of the other NUMA nodes. The server then calculates the fetch priorities of the NUMA nodes based on the fetch hop tables of the NUMA nodes, and uses an NC hop count as an important parameter for fetch priority calculation, where a smaller NC hop count indicates a higher fetch priority. When a NUMA node applies for memory, the server allocates memory based on the fetch priority table, and for a higher priority, more preferentially allocates memory from a NUMA node corresponding to the priority. Therefore, because the NC hop count is used as the important parameter for fetch priority calculation, an opportunity of allocating memory across NCs is reduced during memory allocation, thereby reducing a fetch latency caused by an NC and improving performance of the server.

Figure 8:
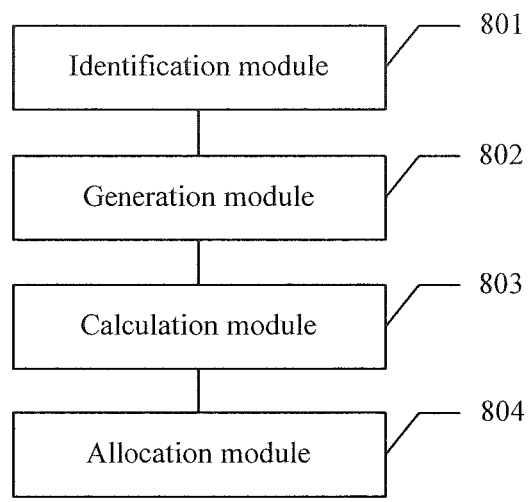
FIG. 8 is a schematic structural diagram of a server according to an embodiment of this application.

The foregoing describes the memory allocation method in the embodiments of this application, and the following describes a server in the embodiments of this application. Referring to FIG. 8, an embodiment of the server in the embodiments of this application includes:

an identification module 801, configured to identify a node topology table, where the node topology table includes a connection relationship between NUMA nodes, a connection relationship between a NUMA node and an NC, and a connection relationship between NCs in the server;

a generation module 802, configured to generate fetch hop tables of the NUMA nodes based on the node topology table obtained by the identification module 801 through identification, where a fetch hop table of a first NUMA node includes an NC hop count and a quick path interconnect QPI hop count of a shortest path through which the first NUMA node is connected to each of the other NUMA nodes, the NC hop count is a quantity of NCs through which the shortest path passes, and the QPI hop count is a quantity of NUMA nodes through which the shortest path passes;

a calculation module 803, configured to calculate fetch priority tables of the NUMA nodes based on the fetch hop tables of the NUMA nodes generated by the generation module 802, where a first fetch priority table of the first NUMA node includes a priority of accessing each of the other NUMA nodes by the first NUMA node, a smaller NC hop count indicates a higher priority of accessing the NUMA node, and for a same NC hop count, a smaller QPI hop count indicates a higher priority of accessing the NUMA node; and an allocation module 804, configured to: when the first NUMA node applies for memory, allocate memory based on the first fetch priority table obtained by the calculation module 803 through calculation, and for a higher priority, more preferentially allocate memory from a NUMA node corresponding to the priority.

In this embodiment of this application, the identification module 801 identifies the node topology table. The node topology table not only includes the connection relationship between NUMA nodes, but also includes the connection relationship between a NUMA node and an NC and the connection relationship between NCs. The generation module 802 generates the fetch hop tables of the NUMA nodes based on the node topology table. A hop table of each NUMA node includes both a QPI hop count and an NC hop count of a shortest path through which the NUMA node is connected to each of the other NUMA nodes. The calculation module 803 then calculates the fetch priorities of the NUMA nodes based on the fetch hop tables of the NUMA nodes, and uses an NC hop count as an important parameter for fetch priority calculation, where a smaller NC hop count indicates a higher fetch priority. When a NUMA node applies for memory, the allocation module 804 allocates memory based on the fetch priority table, and for a higher priority, more preferentially allocates memory from a NUMA node corresponding to the priority. Therefore, because the NC hop count is used as the important parameter for fetch priority calculation, an opportunity of allocating memory across NCs is reduced during memory allocation, thereby reducing a fetch latency caused by an NC and improving performance of the server.

In another embodiment of the server in the embodiments of this application, the allocation module 804 may be further configured to: when there are a plurality of NUMA nodes with a same priority in the first fetch priority table, allocate memory from these NUMA nodes with the same priority according to an interleaved policy.

In this embodiment of this application, the allocation module 804 allocates memory based on priorities in a fetch priority table, and for a same priority, uses the interleaved policy for allocation. Therefore, fetch parallelism is considered when local fetch is preferentially performed, so that an amount of remote fetch is reduced, fetch parallelism is increased, occurrence of fetch congestion is reduced, and system performance is improved.

Figure 9:
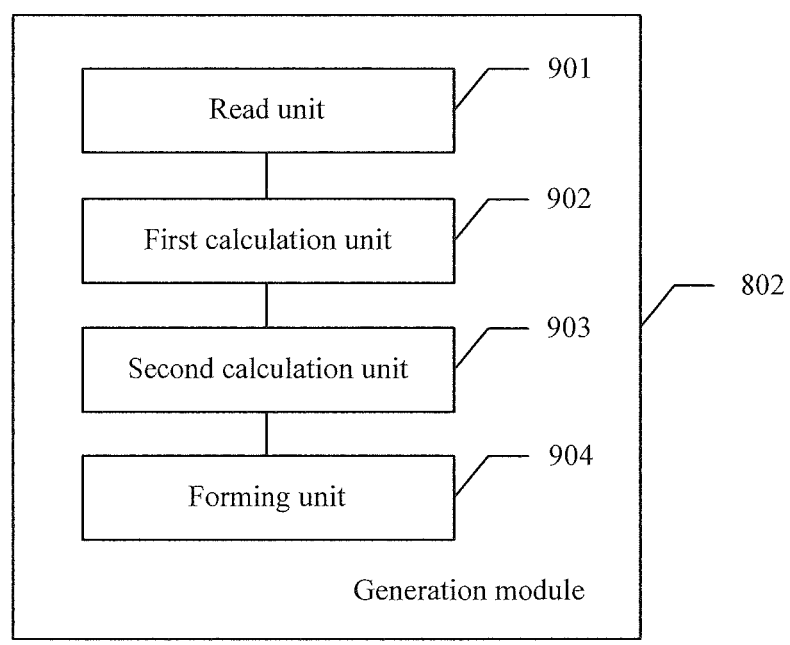
FIG. 9 is a schematic structural diagram of a generation module according to an embodiment of this application.

Referring to FIG. 9, with reference to the embodiment shown in FIG. 8, in another embodiment of the server in the embodiments of this application, the generation module 802 may specifically include:

a read unit 901, configured to read the stored node topology table obtained by the identification module 801 through identification;

a first calculation unit 902, configured to calculate a shortest path from each NUMA node to each of the other NUMA nodes based on the node topology table read by the read unit 901, where the shortest path is a path with a smallest NC hop count in a preselected shortest path, and the preselected shortest path is a path with a smallest QPI hop count in a path from one NUMA node to another NUMA node;

a second calculation unit 903, configured to calculate an NC hop count and a QPI hop count of each shortest path based on the shortest path from each NUMA node to each of the other NUMA nodes obtained by the first calculation unit 902 through calculation; and a forming unit 904, configured to form the fetch hop tables of the NUMA nodes by using the NC hop count and the QPI hop count of the shortest path from each NUMA node to each of the other NUMA nodes obtained by the second calculation unit 903 through calculation.

In this embodiment of this application, the first calculation unit 902 obtains the shortest path through calculation, the second calculation unit 903 obtains the NC hop count and the QPI hop count of each shortest path through calculation, and the forming unit 904 forms the fetch hop tables of the NUMA nodes by using the NC hop count and the QPI hop count of each shortest path, to generate the fetch hop tables of the NUMA nodes.

Figure 10:
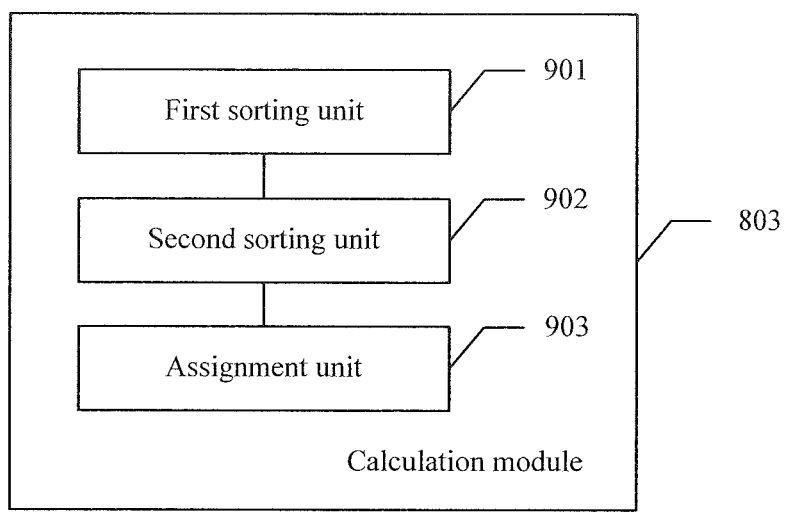
FIG. 10 is a schematic structural diagram of a calculation module according to an embodiment of this application.

Referring to FIG. 10, with reference to the embodiment shown in FIG. 8, in another embodiment of the server in the embodiments of this application, the calculation module 803 may specifically include:

a first sorting unit 1001, configured to sort the NUMA nodes in the fetch hop tables in ascending order of NC hop counts in the fetch hop tables of the NUMA nodes, to obtain a first NUMA node sequence;

a second sorting unit 1002, configured to: for NUMA nodes with a same NC hop count in the first NUMA node sequence, sort the NUMA nodes in ascending order of QPI hop counts in the fetch hop tables, to obtain a second NUMA node sequence; and an assignment unit 1003, configured to sequentially assign priorities to the NUMA nodes in the second NUMA node sequence in descending order of priorities, where priorities of NUMA nodes with a same NC hop count and a same QPI hop count are the same.

In this embodiment of this application, the first sorting unit 1001 and the second sorting unit 1002 first sort the NUMA nodes in the fetch hop tables, and then the assignment unit 1003 sequentially assigns the priorities, to improve priority assignment efficiency.

Figure 11:
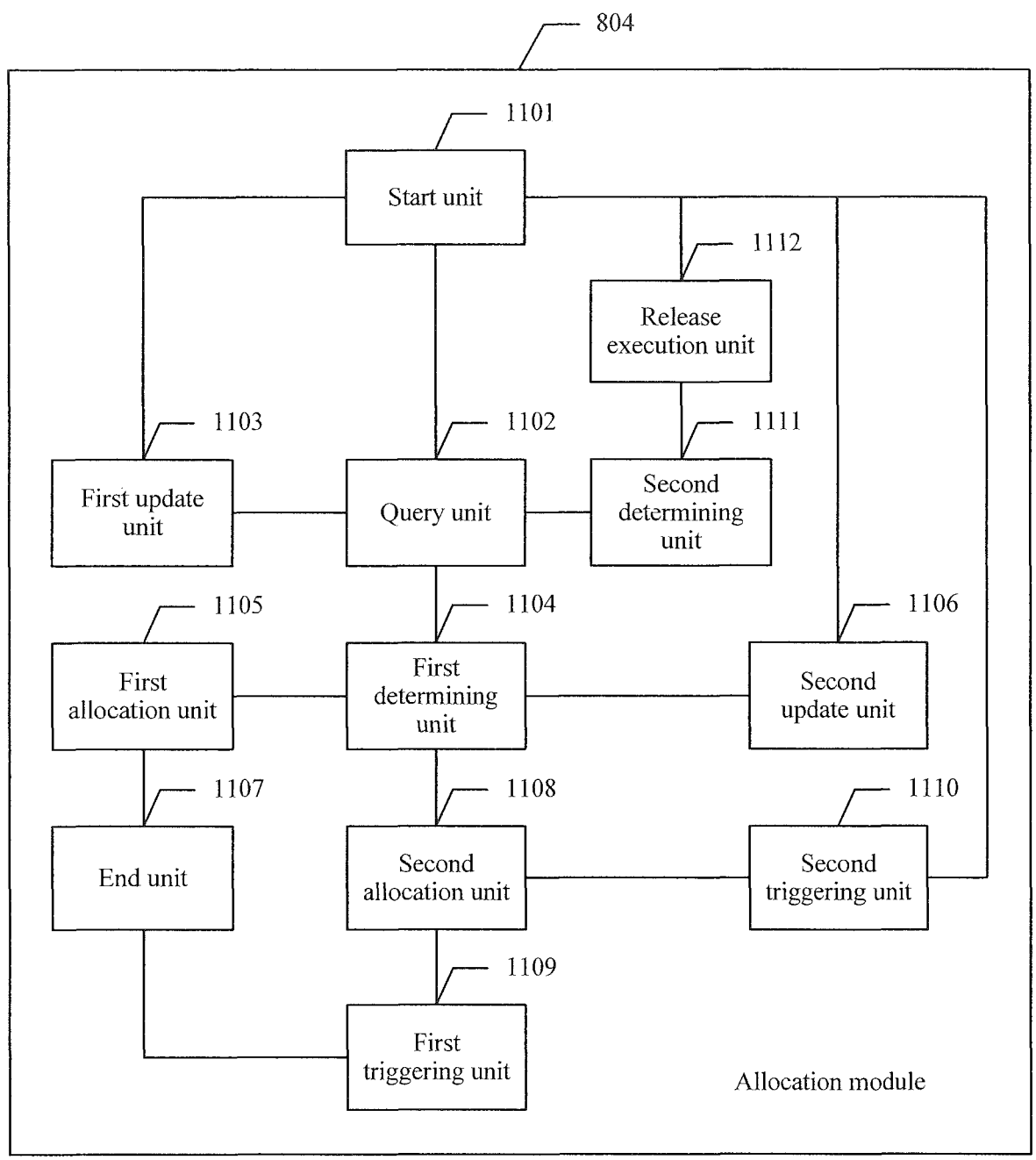
FIG. 11 is a schematic structural diagram of an allocation module according to an embodiment of this application.

Referring to FIG. 11, with reference to the embodiment shown in FIG. 8, in another embodiment of the server in the embodiments of this application, the allocation module 804 may specifically include:

a start unit 1101, configured to: if a current to-be-allocated memory size is a first capacity, a current query priority is a first priority, and the first priority is a priority in the first fetch priority table, trigger a query unit 1102 in descending order of priorities in the first fetch priority table;

the query unit 1102, configured to query whether a NUMA node with the current query priority has free memory;

a first update unit 1103, configured to: when the NUMA node with the current query priority does not have free memory, update the first priority to a priority following the current query priority, and trigger the start unit 1101;

a first determining unit 1104, configured to: when there is only one second NUMA node having free memory whose size is a second capacity in the NUMA node with the current query priority, determine whether the second capacity is not less than the current to-be-allocated memory size;

a first allocation unit 1105, configured to: when the second capacity is not less than the current to-be-allocated memory size, allocate memory whose size is the current to-be-allocated memory size to the first NUMA node from the second NUMA node, and trigger an end unit 1107;

a second update unit 1106, configured to: when the second capacity is less than the current to-be-allocated memory size, allocate the memory whose size is the second capacity to the first NUMA node from the second NUMA node, update the first capacity to the current to-be-allocated memory size minus the second capacity, update the first priority to the priority following the current query priority, and trigger the start unit 1101; and the end unit 1107, configured to end the memory allocation procedure.

The allocation module 804 may further include:

a second allocation unit 1108, configured to: when the query unit 1102 determines that there is more than one third NUMA node having free memory in the NUMA node with the current query priority, allocate memory from the third NUMA nodes according to the interleaved policy, where a size of the allocated memory is a third capacity;

a first triggering unit 1109, configured to: when the third capacity is equal to the current to-be-allocated memory size, trigger the end unit 1107; and a second triggering unit 1110, configured to: when the third capacity is less than the current to-be-allocated memory size, update the first capacity to the current to-be-allocated memory size minus the third capacity, update the first priority to the priority following the current query priority, and trigger the start unit 1101.

The allocation module 804 may further include:

a second determining unit 1111, configured to: when the query unit 1102 learns through querying that no NUMA node has free memory, determine whether a memory release operation is performed, where the memory release operation indicates that temporarily unused memory is swapped to a hard disk buffer, and a release execution unit 1112, configured to: when the second determining unit 1111 determines that the memory release operation is not performed, perform the memory release operation, initialize the current to-be-allocated memory size and the current query priority, and trigger the start unit 1101.

Optionally, the second allocation unit 1108 may specifically include:

a determining subunit, configured to: when the query unit 1102 determines that there is more than one third NUMA node having free memory in the NUMA node with the current query priority, determine whether the current to-be-allocated memory size is greater than one memory page;

a first allocation subunit, configured to: when the current to-be-allocated memory size is greater than one memory page, allocate memory from the third NUMA nodes according to the interleaved policy; and a second allocation subunit, configured to: when the current to-be-allocated size is not greater than one memory page, randomly select one third NUMA node from the third NUMA nodes to allocate memory, and trigger the end unit 1107.

In this embodiment of this application, the allocation module 804 allocates memory based on a fetch priority table, and for a same priority, allocates memory according to the interleaved policy, so that fetch parallelism is considered when a fetch latency caused by an NC is reduced and performance of the server is improved. Therefore, an amount of remote fetch is reduced, fetch parallelism is improved, occurrence of fetch congestion is reduced, and system performance is improved.

Figure 12:
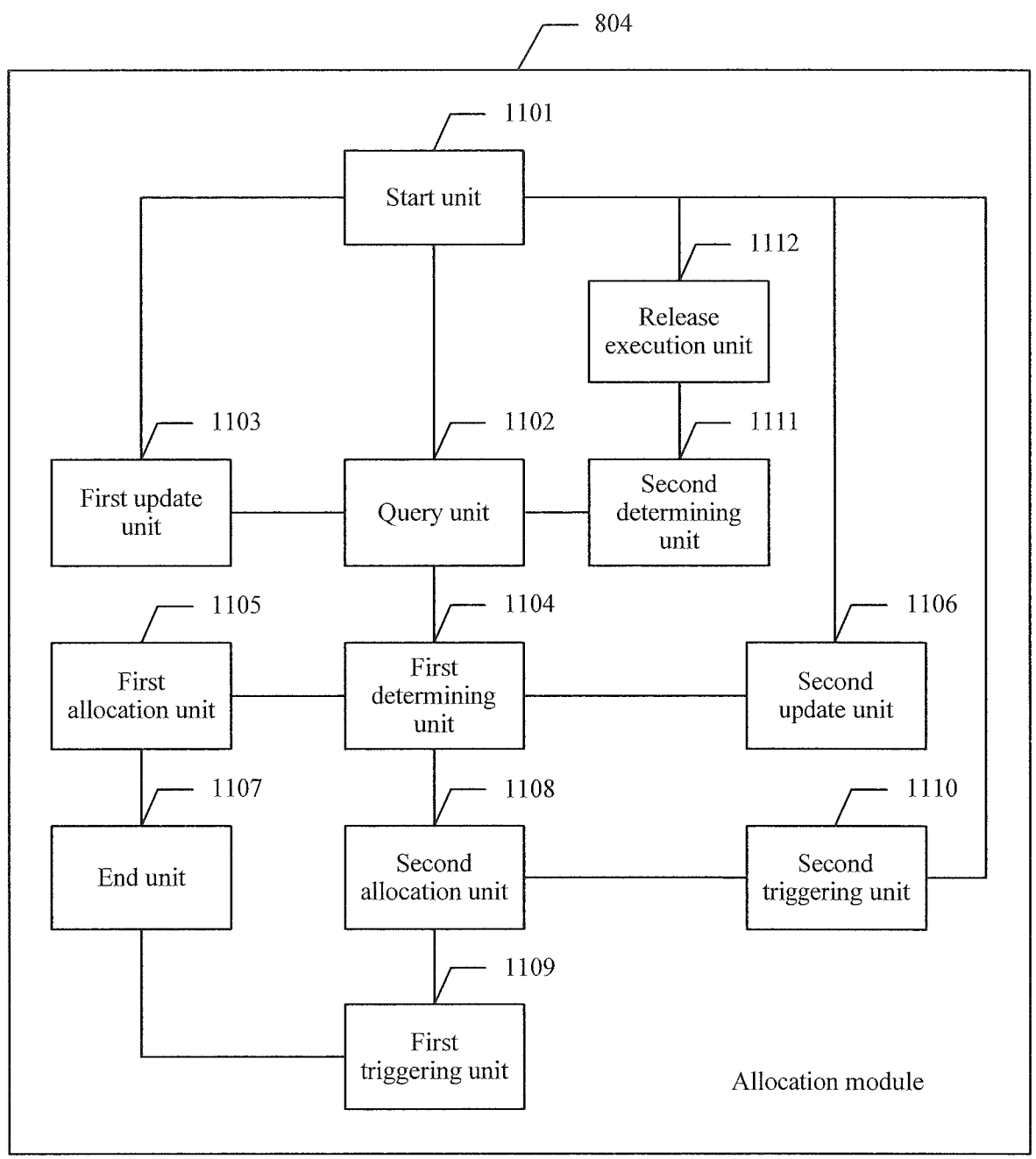
FIG. 12 is a schematic structural diagram of a server according to an embodiment of this application.

The foregoing describes the server in the embodiments of this application from the perspective of a unit function entity, and the following describes the server in the embodiments of this application from the perspective of hardware processing. Referring to FIG. 12, another embodiment of a server 1200 in the embodiments of this application includes:

an input apparatus 1201, an output apparatus 1202, a processor 1203, and a memory 1204 (the server 1200 may include one or more processors 1203, and one processor 1203 is used as an example in FIG. 12). In some embodiments of this application, the input apparatus 1201, the output apparatus 1202, the processor 1203, and the memory 1204 may be connected by using a bus or in another manner. A connection using a bus is used as an example in FIG. 12.

It may be understood that in the diagram of the scenario of the embodiments in FIG. 1, CPUs in all NUMA nodes in the server are integrated to form the processor 1203 in this embodiment of this application, and local memory of all the NUMA nodes is integrated to form the memory 1204 in this embodiment of this application.

The processor 1203 is configured to perform the following steps by invoking an operation instruction stored in the memory 1204:

identifying a node topology table, where the node topology table includes a connection relationship between NUMA nodes, a connection relationship between a NUMA node and an NC, and a connection relationship between NCs in the server;

generating fetch hop tables of the NUMA nodes based on the node topology table, where a fetch hop table of a first NUMA node includes an NC hop count and a quick path interconnect QPI hop count of a shortest path through which the first NUMA node is connected to each of the other NUMA nodes, the NC hop count is a quantity of NCs through which the shortest path passes, and the QPI hop count is a quantity of NUMA nodes through which the shortest path passes;

calculating fetch priority tables of the NUMA nodes based on the fetch hop tables of the NUMA nodes, where a first fetch priority table of the first NUMA node includes a priority of accessing each of the other NUMA nodes by the first NUMA node, a smaller NC hop count indicates a higher priority of accessing the NUMA node, and for a same NC hop count, a smaller QPI hop count indicates a higher priority of accessing the NUMA node; and when the first NUMA node applies for memory, allocating memory based on the first fetch priority table, and for a higher priority, more preferentially allocating memory from a NUMA node corresponding to the priority.

In some embodiments of this application, the processor 1203 is further configured to perform the following step:

when there are a plurality of NUMA nodes with a same priority in the first fetch priority table, allocating memory from these NUMA nodes with the same priority according to an interleaved policy.

In some embodiments of this application, when performing the step of generating fetch hop tables of the NUMA nodes based on the node topology table, the processor 1203 specifically performs the following steps:

reading the stored node topology table;

calculating a shortest path from each NUMA node to each of the other NUMA nodes based on the node topology table, where the shortest path is a path with a smallest NC hop count in a preselected shortest path, and the preselected shortest path is a path with a smallest QPI hop count in a path from one NUMA node to another NUMA node;

calculating an NC hop count and a QPI hop count of each shortest path based on the shortest path from each NUMA node to each of the other NUMA nodes; and forming the fetch hop tables of the NUMA nodes by using the NC hop count and the QPI hop count of the shortest path from each NUMA node to each of the other NUMA nodes.

In some embodiments of this application, when performing the step of calculating fetch priority tables of the NUMA nodes based on the fetch hop tables of the NUMA nodes, the processor 1203 specifically performs the following steps:

sorting the NUMA nodes in the fetch hop tables in ascending order of NC hop counts in the fetch hop tables of the NUMA nodes, to obtain a first NUMA node sequence;

for NUMA nodes with a same NC hop count in the first NUMA node sequence, sorting the NUMA nodes in ascending order of QPI hop counts in the fetch hop tables, to obtain a second NUMA node sequence; and sequentially assigning priorities to the NUMA nodes in the second NUMA node sequence in descending order of priorities, where priorities of NUMA nodes with a same NC hop count and a same QPI hop count are the same.

In some embodiments of this application, when performing the step of allocating memory based on the first fetch priority table, the processor 1203 specifically performs the following steps:

if a current to-be-allocated memory size is a first capacity, a current query priority is a first priority, and the first priority is a priority in the first fetch priority table, allocating memory in descending order of priorities in the first fetch priority table according to the following procedure:

querying whether a NUMA node with the current query priority has free memory;

if the NUMA node with the current query priority does not have free memory, updating the first priority to a priority following the current query priority, and triggering the step of allocating memory according to the following procedure;

if there is only one second NUMA node having free memory whose size is a second capacity in the NUMA node with the current query priority, determining whether the second capacity is not less than the current to-be-allocated memory size;

if the second capacity is not less than the current to-be-allocated memory size, allocating memory whose size is the current to-be-allocated memory size to the first NUMA node from the second NUMA node, and ending the memory allocation procedure; and if the second capacity is less than the current to-be-allocated memory size, allocating the memory whose size is the second capacity to the first NUMA node from the second NUMA node, updating the first capacity to the current to-be-allocated memory size minus the second capacity, updating the first priority to the priority following the current query priority, and triggering the step of allocating memory according to the following procedure.

In some embodiments of this application, after performing the step of querying whether a NUMA node with the current query priority has free memory, the processor 1203 further performs the following steps:

if there is more than one third NUMA node having free memory in the NUMA node with the current query priority, allocating memory from the third NUMA nodes according to the interleaved policy, where a size of the allocated memory is a third capacity;

if the third capacity is equal to the current to-be-allocated memory size, ending the memory allocation procedure; and if the third capacity is less than the current to-be-allocated memory size, updating the first capacity to the current to-be-allocated memory size minus the third capacity, updating the first priority to the priority following the current query priority, and triggering the step of allocating memory according to the following procedure.

In some embodiments of this application, after the processor 1203 performs the step of querying whether a NUMA node with the current query priority has free memory, the processor 1203 further performs the following steps:

if learning through querying that no NUMA node has free memory, determining whether a memory release operation is performed, where the memory release operation indicates that temporarily unused memory is swapped to a hard disk buffer, and if the memory release operation is not performed, performing the memory release operation, initializing the current to-be-allocated memory size and the current query priority, and triggering the step of allocating memory according to the following procedure.

In some embodiments of this application, before the processor 1203 performs the step of allocating memory from the third NUMA nodes according to the interleaved policy, the processor 1203 further performs the following steps:

determining whether the current to-be-allocated memory size is greater than one memory page;

if the current to-be-allocated memory size is greater than one memory page, triggering the step of allocating memory from the third NUMA nodes according to the interleaved policy; and if the current to-be-allocated size is not greater than one memory page, randomly selecting one third NUMA node from the third NUMA nodes to allocate memory, and ending the memory allocation procedure.

In some embodiments of this application, the node topology table is an $(N+M) \times (N+M)$ matrix S, N is a quantity of NUMA nodes in the server, M is a quantity of NCs in the server, the first N columns and N rows of the matrix S indicate the NUMA nodes, the last M columns and M rows of the matrix S indicate the NCs, a value in a $p^{th}$ row and a $q^{th}$ column of the matrix S indicates a connection relationship between a node p and a node q, and N, M, p, and q are all positive integers.

It may be clearly understood by persons skilled in the art that for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A memory allocation method, comprising:
   receiving, by a server, a request for memory application by a first Non-Uniform Memory Architecture (NUMA) node, wherein the server comprises a plurality of NUMA nodes and each NUMA node comprises a group of central processing units (CPU) and memory;
   obtaining, by the server, a first fetch priority table, wherein the first fetch priority table indicates a priority of accessing each of the other NUMA nodes by the first NUMA node, and wherein the priority is based on a connection relationship between the plurality of NUMA nodes and a node controller (NC); and
   allocating, by the server, a memory resource to the first NUMA node based on the first fetch priority table.

2. The method according to claim 1, wherein a smaller NC hop count indicates a higher priority of accessing the NUMA node, and for a same NC hop count, a smaller Quick Path Interconnect (QPI) hop count indicates a higher priority of accessing the NUMA node.

3. The method according to claim 1, wherein the step of allocating the memory resource further comprises selecting a memory resource of a NUMA node with the highest priority of the plurality of NUMA nodes based on the first fetch priority table.

4. The method according to claim 1, wherein the obtaining, by the server, the first fetch priority table comprises:
   identifying, by the server, a node topology table, wherein the node topology table comprises a connection relationship among the plurality of NUMA nodes, a connection relationship between the first NUMA node and a node controller NC, and a connection relationship between NCs in the server;
   generating, by the server, a fetch hop table of the first NUMA node based on the node topology table, wherein the fetch hop table of the first NUMA node comprises an NC hop count and a quick path interconnect (QPI) hop count of a shortest path through which the first NUMA node is connected to each of the other NUMA nodes, the NC hop count is a quantity of NCs through which the shortest path passes, the QPI hop count is a quantity of the NUMA nodes through which the shortest path passes, and the first NUMA node is one of the NUMA nodes;
   calculating, by the server, the first fetch priority table of the first NUMA node based on the fetch hop table of the first NUMA node.

5. The method according to claim 4, wherein the generating, by the server, the fetch hop table of the first NUMA nodes based on the node topology table further comprises:
   reading, by the server, the stored node topology table;
   calculating, by the server, a shortest path from the first NUMA node to each of the other NUMA nodes based on the node topology table, wherein the shortest path is a path with a smallest NC hop count in a preselected shortest path, and the preselected shortest path is a path with a smallest QPI hop count in a path from one NUMA node to another NUMA node;
   calculating, by the server, an NC hop count and a QPI hop count of each shortest path based on the shortest path from the first NUMA node to each of the other NUMA nodes; and
   forming, by the server, the fetch hop table of the first NUMA node by using the NC hop count and the QPI hop count of the shortest path from the first NUMA node to each of the other NUMA nodes.

6. The method according to claim 4, wherein the calculating, by the server, the first fetch priority table of the first NUMA node based on the fetch hop table of the first NUMA node further comprises:
   sorting, by the server, the NUMA nodes in the fetch hop table in ascending order of NC hop counts in the fetch hop table of the NUMA nodes, to obtain a first NUMA node sequence;
   for NUMA nodes with a same NC hop count in the first NUMA node sequence, sorting, by the server, the NUMA nodes in ascending order of QPI hop counts in the fetch hop table, to obtain a second NUMA node sequence; and
   sequentially assigning, by the server, priorities to the NUMA nodes in the second NUMA node sequence in descending order of priorities, wherein priorities of NUMA nodes with a same NC hop count and a same QPI hop count are the same.

7. The method according to claim 4 wherein the node topology table is an $(N+M)\times(N+M)$ matrix S, N is a quantity of NUMA nodes in the server, M is a quantity of NCs in the server, the first N columns and N rows of the matrix S indicate the NUMA nodes, the last M columns and M rows of the matrix S indicate the NCs, a value in a $p^{th}$ row and a $q^{th}$ column of the matrix S indicates a connection relationship between a node p and a node q, and N, M, p, and q are all positive integers.

8. The method according to claim 1, further comprising:
   when there is a plurality of NUMA nodes with a same priority in the first fetch priority table, allocating, by the server, memory resource from the plurality of NUMA nodes with the same priority according to an interleaved policy.

9. The method according to claim 1, wherein the allocating, by the server, memory based on the first fetch priority table further comprises:

allocating, by the server, the memory resource in descending order of priorities in the first fetch priority table, wherein a current to-be-allocated memory size is a first capacity and a current query priority is a first priority, and the first priority is a priority in the first fetch priority table;

querying, by the server, whether a NUMA node with the current query priority has free memory;

when the NUMA node with the current query priority does not have a free memory resource, updating, by the server, the first priority to a priority following the current query priority, and triggering the step of allocating memory; or when there is only one second NUMA node having free memory resource whose size is a second capacity in the NUMA node with the current query priority, determining, by the server, whether the second capacity is not less than the current to-be-allocated memory size; or when the second capacity is not less than the current to-be-allocated memory size, allocating, by the server, memory whose size is the current to-be-allocated memory size to the first NUMA node from the second NUMA node, and ending the memory allocation procedure; or when the second capacity is less than the current to-be-allocated memory size, allocating, by the server, the memory whose size is the second capacity to the first NUMA node from the second NUMA node, updating the first capacity to the current to-be-allocated memory size minus the second capacity, updating the first priority to the priority following the current query priority, and triggering the step of allocating memory.

10. The method according to claim 9, wherein after the step of querying, by the server, whether a NUMA node with the current query priority has free memory, the method further comprises:

when there is more than one third NUMA node having free memory in the NUMA node with the current query priority, allocating, by the server, memory from the third NUMA nodes according to the interleaved policy, wherein a size of the allocated memory is a third capacity; or when the third capacity is equal to the current to-be-allocated memory size, ending the memory allocation procedure; or when the third capacity is less than the current to-be-allocated memory size, updating, by the server, the first capacity to the current to-be-allocated memory size minus the third capacity, updating the first priority to the priority following the current query priority, and triggering the step of allocating memory.

11. The method according to claim 10, wherein before the step of allocating, by the server, memory from the third NUMA nodes according to the interleaved policy, the method further comprises:

determining, by the server, whether the current to-be-allocated memory size is greater than one memory page; or when the current to-be-allocated memory size is greater than one memory page, triggering the step of allocating, by the server, memory from the third NUMA nodes according to the interleaved policy; or when the current to-be-allocated size is not greater than one memory page, randomly selecting, by the server, one third NUMA node from the third NUMA nodes to allocate memory, and ending the memory allocation procedure.

12. A server for memory resource allocating, wherein the server comprises a processor and a memory; and the memory is configured to store a computer execution instruction, and when a proxy server runs, the processor executes the computer execution instruction stored in the memory to:

receive a request for memory application by a first Non-Uniform Memory Architecture (NUMA) node, wherein the server comprise a plurality of NUMA node and each NUMA node comprises a group of central processing units (CPU) and memory;

obtain a first fetch priority table, wherein the first fetch priority table indicates a priority of accessing each of the other NUMA nodes by the first NUMA node;

allocate a memory resource to the first NUMA node based on the first fetch priority table.

13. The server according to claim 12, wherein the processor is configured to:

identify a node topology table, wherein the node topology table comprises a connection relationship among the NUMA node, a connection relationship between a NUMA node and a node controller NC, and a connection relationship between NCs in the server;

generate a fetch hop table of a first NUMA node based on the node topology table, wherein the fetch hop table of the first NUMA node comprises an NC hop count and a quick path interconnect (QPI) hop count of a shortest path through which the first NUMA node is connected to each of the other NUMA nodes, the NC hop count is a quantity of NCs through which the shortest path passes, the QPI hop count is a quantity of the NUMA nodes through which the shortest path passes, and the first NUMA node is one of the NUMA nodes; and calculate the first fetch priority table of the first NUMA node based on the fetch hop table of the first NUMA node.

14. The server according to claim 12, wherein the processor is configured to:

read the stored node topology table;

calculate a shortest path from the first NUMA node to each of the other NUMA nodes based on the node topology table, wherein the shortest path is a path with a smallest NC hop count in a preselected shortest path, and the preselected shortest path is a path with a smallest QPI hop count in a path from one NUMA node to another NUMA node;

calculate an NC hop count and a QPI hop count of each shortest path based on the shortest path from the first NUMA node to each of the other NUMA nodes; and form the fetch hop table of the first NUMA node by using the NC hop count and the QPI hop count of the shortest path from the first NUMA node to each of the other NUMA nodes.

15. The server according to claim 12, wherein the processor is configured to:

sort the NUMA nodes in the fetch hop table in ascending order of NC hop counts in the fetch hop table of the NUMA nodes, to obtain a first NUMA node sequence;

for NUMA nodes with a same NC hop count in the first NUMA node sequence, sort the NUMA nodes in ascending order of QPI hop counts in the fetch hop table, to obtain a second NUMA node sequence; and sequentially assign priorities to the NUMA nodes in the second NUMA node sequence in descending order of priorities, wherein priorities of NUMA nodes with a same NC hop count and a same QPI hop count are the same.

16. The server according to claim 12, wherein the processor is configured to:
- allocate the memory resource in descending order of priorities in the first fetch priority table, wherein a current to-be-allocated memory size is a first capacity and a current query priority is a first priority, and the first priority is a priority in the first fetch priority table;
- query whether a NUMA node with the current query priority has free memory;
- when the NUMA node with the current query priority does not have a free memory resource, update the first priority to a priority following the current query priority, and triggering the step of allocating memory; or
- when there is only one second NUMA node having free memory resource whose size is a second capacity in the NUMA node with the current query priority, determine whether the second capacity is not less than the current to-be-allocated memory size; or
- when the second capacity is not less than the current to-be-allocated memory size, allocate memory whose size is the current to-be-allocated memory size to the first NUMA node from the second NUMA node, and ending the memory allocation procedure; or
- when the second capacity is less than the current to-be-allocated memory size, allocate the memory whose size is the second capacity to the first NUMA node from the second NUMA node, update the first capacity to the current to-be-allocated memory size minus the second capacity, update the first priority to the priority following the current query priority, and trigger the step of allocating memory.

17. The server according to claim 12, wherein the processor is configured to:
- when there is more than one third NUMA node having free memory in the NUMA node with the current query priority, allocate memory from the third NUMA nodes according to the interleaved policy, wherein a size of the allocated memory is a third capacity; or
- when the third capacity is equal to the current to-be-allocated memory size, end the memory avocation procedure; or
- when the third capacity is less than the current to-be-allocated memory size, update the first capacity to the current to-be-allocated memory size minus the third capacity, update the first priority to the priority following the current query priority, and trigger the step of allocating memory.

18. The server according to claim 12, wherein the processor is configured to:
- determine whether the current to-be-allocated memory size is greater than one memory page;
- when the current to-be-allocated memory size is greater than one memory page, triggering the step of allocate memory from the third NUMA nodes according to the interleaved policy; and
- when the current to-be-allocated size is not greater than one memory page, randomly select one third NUMA node from the third NUMA nodes to allocate memory, and ending the memory allocation procedure.

19. The server according to claim 12, wherein the node topology table is an (N+M)×(N+M) matrix S, N is a quantity of NUMA nodes in the server, M is a quantity of NCs in the server, the first N columns and N rows of the matrix S indicate the NUMA nodes, the last M columns and M rows of the matrix S indicate the NCs, a value in a $p^{th}$ row and a $q^{th}$ column of the matrix S indicates a connection relationship between a node p and a node q, and N, M, p, and q are all positive integers.

20. A non-volatile computer-readable storage medium comprising instructions which, when executed by a computer, cause the computer to carry out steps:
- receive a request for memory application by a first Non-Uniform Memory Architecture (NUMA) node, wherein the server comprise a plurality of NUMA node and each NUMA node comprises a group of central processing unit (CPU) and memory;
- obtain a first fetch priority table, wherein the first fetch priority table indicates a priority of accessing each of the other NUMA nodes by the first NUMA node, and wherein the priority is based on a connection relationship between the plurality of NUMA nodes and a node controller (NC); and
- allocate a memory resource to the first NUMA node based on the first fetch priority table.

* * * * *